United States Patent
Agari et al.

(10) Patent No.: US 8,259,086 B2
(45) Date of Patent: Sep. 4, 2012

(54) TOUCH PANEL AND DISPLAY DEVICE COMPRISING THE SAME

(75) Inventors: Masafumi Agari, Tokyo (JP); Naoki Nakagawa, Tokyo (JP); Seiichiro Mori, Tokyo (JP); Hiroyuki Murai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 301 days.

(21) Appl. No.: 12/740,124

(22) PCT Filed: Nov. 10, 2008

(86) PCT No.: PCT/JP2008/070382
§ 371 (c)(1),
(2), (4) Date: Apr. 28, 2010

(87) PCT Pub. No.: WO2009/063817
PCT Pub. Date: May 22, 2009

(65) Prior Publication Data
US 2010/0253647 A1    Oct. 7, 2010

(30) Foreign Application Priority Data
Nov. 12, 2007 (JP) .................. 2007-292696

(51) Int. Cl.
G06F 3/041 (2006.01)
G06F 3/044 (2006.01)
G08C 21/00 (2006.01)
(52) U.S. Cl. .................. 345/173; 178/18.06
(58) Field of Classification Search .... 178/18.01–18.07; 345/173–177
See application file for complete search history.

(56) References Cited

U.S. PATENT DOCUMENTS

| 5,675,130 A | 10/1997 | Sekizawa |
| 5,844,506 A | 12/1998 | Binstead |
| 6,239,789 B1 * | 5/2001 | Sekizawa et al. ............. 345/173 |
| 2006/0092143 A1 | 5/2006 | Kasai et al. |
| 2010/0301879 A1 * | 12/2010 | Philipp ......................... 324/679 |

FOREIGN PATENT DOCUMENTS

JP    7 281813    10/1995
(Continued)

Primary Examiner — Bipin Shalwala
Assistant Examiner — Hang Lin
(74) Attorney, Agent, or Firm — Oblon, Spivak, McClelland, Maier & Neustadt, L.L.P.

(57) ABSTRACT

A touch panel capable of calculating touch position coordinates of an indicator with high accuracy in a desired detection time even if a large number of detection wire groups are provided. An oscillator circuit selects one of detection wires and selected by a circuit or the like according to a command from a detection control circuit and oscillates. A circuit counts an output signal from the oscillator circuit up to a first count value. A circuit measures a period of the count. A circuit determines that there is a touch when it detects the detection wire of which the measured period is equal to or higher than a threshold value and sends the detection wire giving a maximum value equal to or higher than the threshold value to a circuit as a touch detection wire. The circuit causes the circuit or the like to select the touch detection wire and the detection wires adjacent thereto on both sides, the circuit counts up until the count value becomes a second count value larger than the first count value, and the circuit measures the count period. The circuit performs interpolation on the basis of the count value obtained by subtracting a background capacitance value from a measured value obtained by the circuit, to thereby determine the touch coordinates.

7 Claims, 11 Drawing Sheets

FOREIGN PATENT DOCUMENTS

| | | |
|---|---|---|
| JP | 6 305480 | 11/1996 |
| JP | 9 511086 | 11/1997 |
| JP | 10 171582 | 6/1998 |
| JP | 2000 259351 | 9/2000 |
| JP | 2006 127101 | 5/2006 |
| JP | 2008 134836 | 6/2006 |
| JP | 2007 47990 | 2/2007 |

* cited by examiner

<VIEW OF OVERALL STRUCTURE OF TOUCH PANEL>

F I G. 5
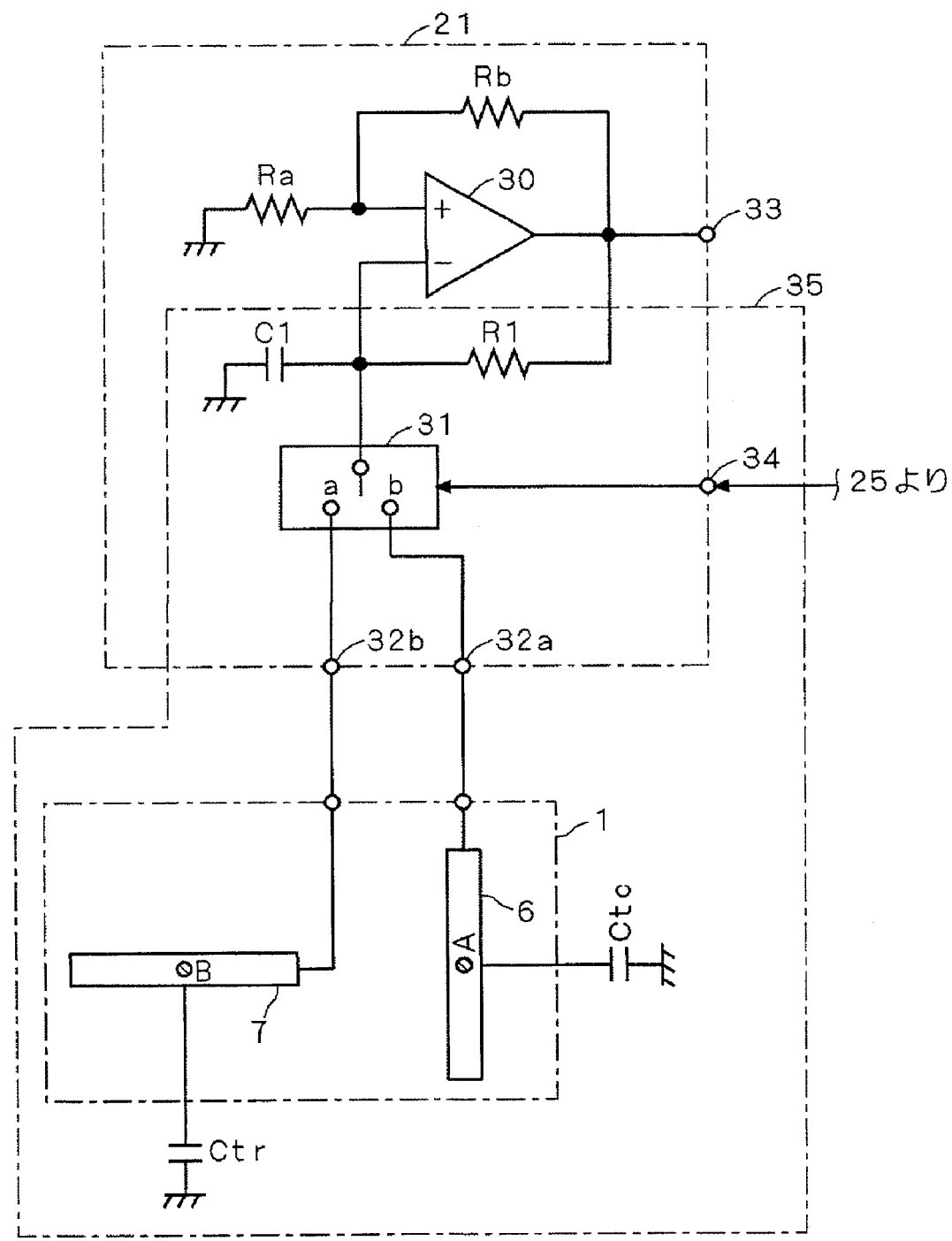

F I G . 1 0
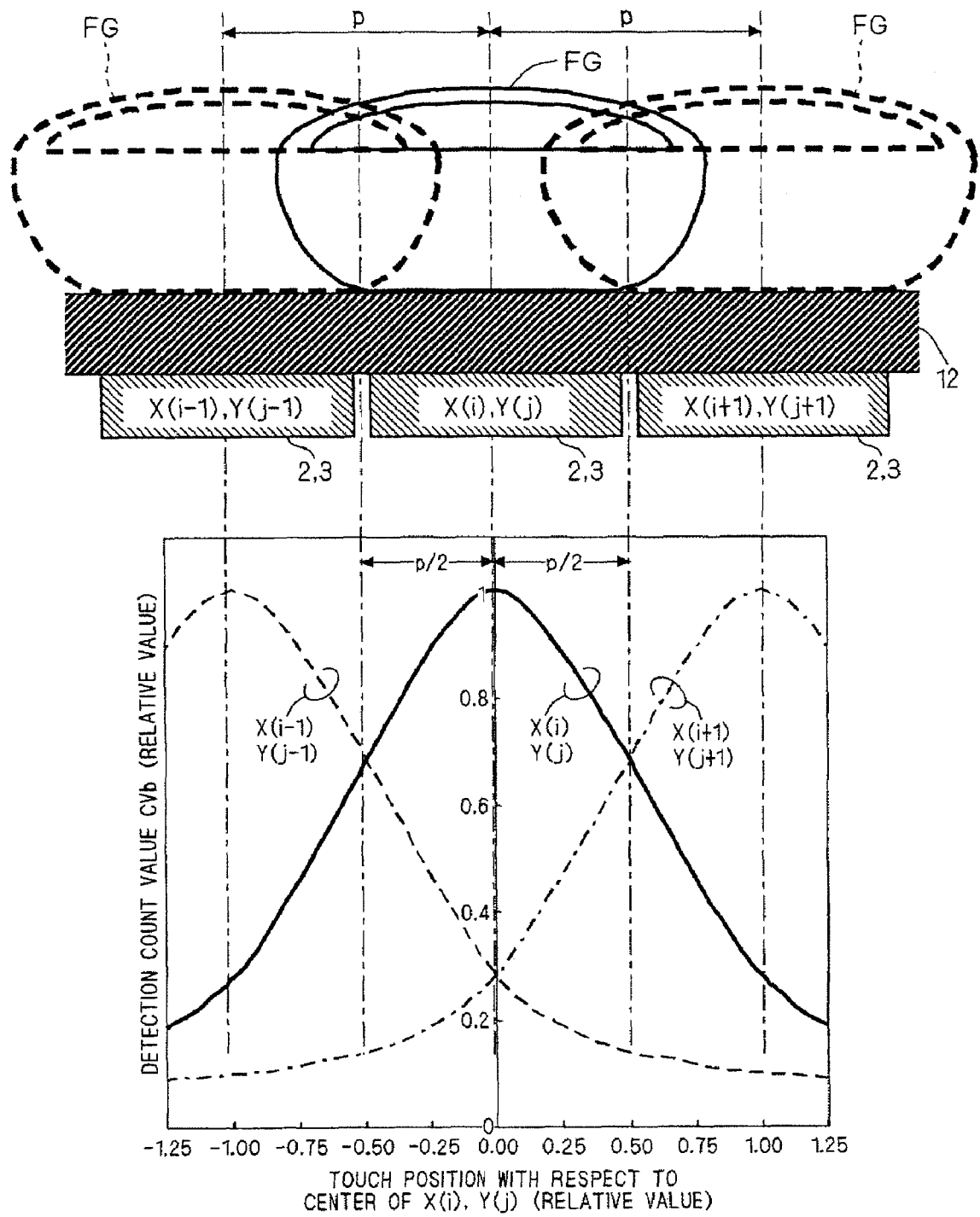

TOUCH PANEL AND DISPLAY DEVICE COMPRISING THE SAME

TECHNICAL FIELD

The present invention relates to a touch panel and a display device comprising the touch panel.

BACKGROUND ART

As one of excellent user interface means, a touch panel which detects a touch of a finger or the like and specifies the position coordinates thereof has received attention.

and various types of touch panels such as a resistance film type and a capacitive touchscreen system are commercialized.

The capacitive touchscreen system includes a projected capacitive touchscreen system capable of detecting a touch even if the front surface side of the touch screen in which a touch sensor is incorporated is covered with a protection plate such as a glass plate having a thickness of about several mm. This system has the advantages that excellent fastness can be achieved since the protection plate can be arranged on the front surface, that detection of a touch is possible even when a user wears gloves, that long-life is ensured since this system has no movable part, and the like.

The touch screen of the touch panel disclosed in Patent Document 1, for example, comprises a conductive element of the first series formed on a thin dielectric film and a conductive element of the second series formed with an insulating film interposed therebetween as detecting conductors for detecting an electrostatic capacitance, and there is no electrical contact between these conductive elements but a plurality of intersection points are formed therebetween. The materials best suitable for the conductive elements are metal materials such as silver. Further, the material depends on the required visibility of display, and if the visibility is intended to be low, indium oxide is used. Instead of the conductive element, a fine wire of 10 µm to 20 µm can be used. The conductive elements for detecting the electrostatic capacitance are connected to a capacity control oscillator through an output line and a multiplexer. The output therefrom is counted by a divider and becomes capacitance detection data. With the relative values of the detection capacitances of one or more conductive elements, the touch position between the conductive elements can be interpolated.

Patent Document 1: National Publication of Translation No. 1997-511086 (line 19 of page 7 to line 4 of page 8, line 23 of page 8 to line 6 of page 9, lines 4 to 12 of page 13, line 23 of page 13 to line 10 of page 14, FIGS. 1, 2, 6, and 8)

As such a capacity control oscillator as discussed above, a relaxation oscillator can be used. The oscillation cycle of the relaxation oscillator generally depends on the charge/discharge time constants of a resistance element and a capacitive element. By utilizing the electrostatic capacitance (hereinafter, referred to as a "touch capacitance") formed between a detection wire and a finger of a user or the like (hereinafter, referred to as an "indicator") to form part of the capacitive element, if the indicator makes a touch, there arises variation in the oscillation cycle of the relaxation oscillator according to the touch capacitance formed between the detection wire and the indicator. By detecting the variation of the oscillation cycle, the touch capacitance is detected and, with the touch capacitance detected at, for example, adjacent detection wires, it is possible to calculate the touch position between the adjacent wires as touch coordinates by interpolation.

In order to ensure interpolation of the touch coordinates with high accuracy, it is important to increase the capacitance detection sensitivity of the detection wires around the touch position.

If the capacitance detection sensitivity is set uniformly for all the detection wires, however, when the number of detection wires increases, the detection time accordingly increases and the detection time cannot satisfy a desired detection time (generally, 100 ms or shorter). This causes an unpleasantness in operation. If the desired detection time is intended to be satisfied, the capacitance detection sensitivity for one detection wire required for interpolation cannot be ensured and this arises a problem that the touch coordinates cannot be accurately calculated.

DISCLOSURE OF INVENTION

The present invention is intended to solve the above problem, and it is an object of the present invention to provide a touch panel capable of calculating the touch coordinates by interpolating the touch coordinates with high accuracy in a desired detection time even if a large number of detection wires are provided and a display device having a touch panel function capable of increasing the accuracy of a calculated touch coordinate value while shortening the time required for determination of the touch coordinates.

The present invention is intended for a touch panel. According to the present invention, the touch panel includes a touch screen having a plurality of detection wires formed in each of a row direction and a column direction, a detection control circuit, a switching circuit for sequentially selecting the plurality of detection wires formed in at least one of the row direction and the column direction according to a command of a control signal outputted from the detection control circuit, an electrostatic capacitance detection circuit for detecting a detection signal for each of the detection wires which is selected by the switching circuit according to detection accuracy given from the detection control circuit, the detection signal having a value corresponding to a value of electrostatic capacitance formed between the selected detection wire and an indicator that touches the touch screen, and a touch position calculation circuit having data of coordinate system fixed on the touch screen, for calculating a touch coordinate value on the touch screen which indicates a touch position of the indicator on the basis of the detection signal which is outputted from the electrostatic capacitance detection circuit for each selected detection wire and the coordinate system data, and in the touch panel of the present invention, as an operation of a normal detection mode, the detection control circuit sets the detection accuracy to first detection accuracy, sets the first detection accuracy in the electrostatic capacitance detection circuit, and outputs the control signal to the switching circuit, to thereby cause the switching circuit to sequentially select all the plurality of detection wires formed in the one direction, the electrostatic capacitance detection circuit detects a value of the detection signal of each selected detection wire according to the first detection accuracy and sends the value to the touch position calculation circuit, the touch position calculation circuit determines if there is a touch of the indicator on the touch screen on the basis of the values of the detection signals of all selected detection wires detected by the electrostatic capacitance detection circuit and sends the determination result to the detection control circuit, and if the determination result indicates that there is a touch of the indicator on the touch screen, the touch position calculation circuit specifies a detection wire corresponding to the touch position of the indicator among the plurality of detection wires formed in the one direction as a touch detection wire and sends information on the touch detection wire to the detection control circuit, and the detection control circuit maintains the operation of the normal detection mode while the determination result sent from the touch position calculation circuit indicates that there is no touch of the indicator on the touch screen, when if the determination result indicates that there is a touch of the indicator on the touch screen, as an operation of a high-accuracy detection mode, the detection control circuit changes the detection accuracy to second detection accuracy higher than the first detection accuracy, sets the second detection accuracy in the electrostatic capacitance detection circuit, and outputs the control signal to the switching circuit, the control signal commanding the switching circuit to select the touch detection wire and adjacent touch detection wires adjacent to the touch detection wire, to thereby cause the switching circuit to sequentially select the touch detection wire and the adjacent touch detection wires, the electrostatic capacitance detection circuit detects again values of respective detection signals of the touch detection wire and the adjacent touch detection wires according to the second detection accuracy and sends the values to the touch position calculation circuit, the touch position calculation circuit determines a coordinate value corresponding to the touch detection wire in the one direction on the touch screen on the basis of the coordinate system data, performs predetermined interpolation with respect to the determined coordinate value corresponding to the touch detection wire in the one direction on the touch screen on the basis of the value of the detection signal of the touch detection wire and the values of the respective detection signals of the adjacent touch detection wires, to thereby determine an interpolated coordinate value in the one direction as the touch coordinate value in the one direction, and sends out the determined touch coordinate value to the outside, and the detection control circuit changes the detection accuracy from the second detection accuracy to the first detection accuracy again in response to the sending of the touch coordinate value by the touch position calculation circuit, whereby the mode returns from the high-accuracy detection mode to the normal detection mode.

In the present invention, when the touch of the indicator is detected, detection is performed again with increased detection accuracy and interpolation is performed. Therefore, as compared with the case where the detection accuracy is high all the time, it is possible to shorten the time required for detection while ensuring the detection accuracy. This increases the accuracy of the calculated touch coordinates while shortening the time required for determination of the touch coordinates.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a circuit diagram showing a circuit configuration of an oscillator circuit included in the touch panel in accordance with the first preferred embodiment of the present invention and connection between the oscillator circuit and detection wire groups;

FIG. 10 is a view showing an example of variation in detection count values depending on the touch positions in the touch panel in accordance with the first preferred embodiment of the present invention;

BEST MODE FOR CARRYING OUT THE INVENTION

The First Preferred Embodiment

Figure 1:
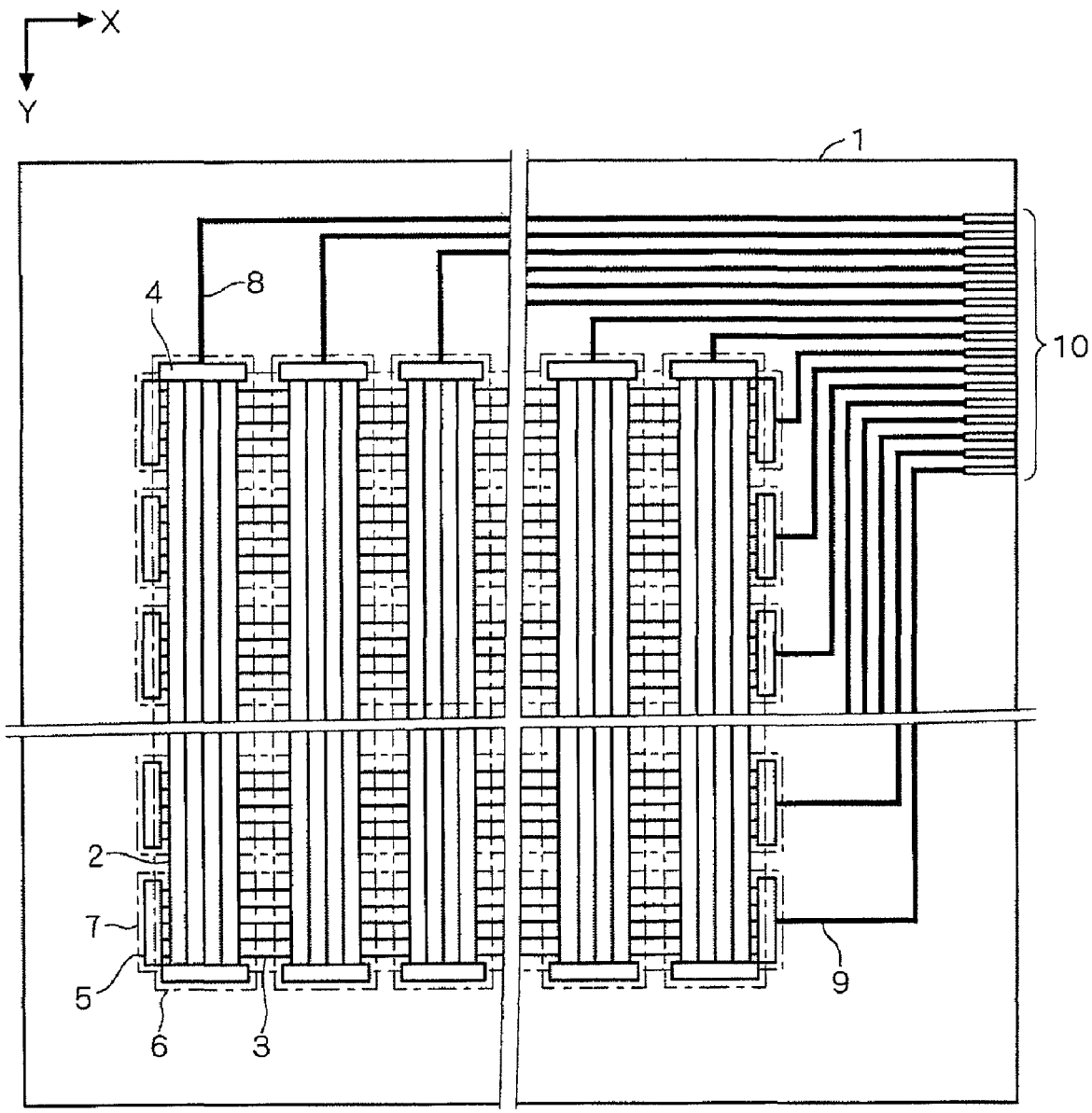
FIG. 1 is a plan view showing a configuration of a touch screen included in a touch panel in accordance with a first preferred embodiment of the present invention.
Figure 2:
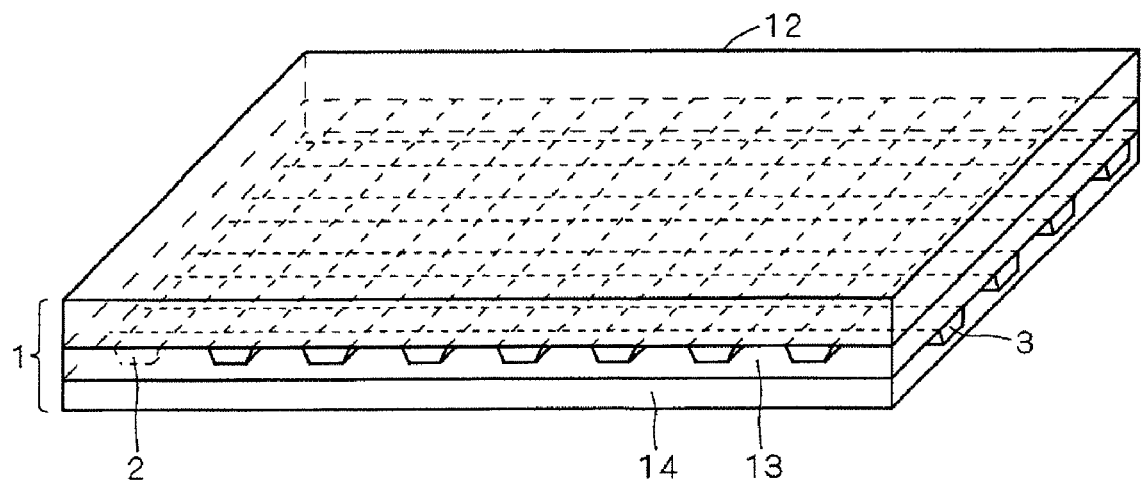
FIG. 2 is a partially sectional perspective view showing the configuration of the touch screen in accordance with the first preferred embodiment of the present invention.

FIG. 1 is a plan view showing a configuration of a touch screen 1 included in a touch panel in accordance with the first preferred embodiment, and FIG. 2 is a partially sectional perspective view thereof. Hereinafter, the constitution of the touch screen 1 will be discussed with reference to figures. In the following figures including the figure of the second preferred embodiment, reference signs identical to those of FIGS. 1 and 2 represent the same or corresponding constituent elements.

As shown in FIG. 1, the touch screen 1 comprises a plurality of detection column wires 2 each extending in a column direction (y direction in FIG. 1), which are arranged in parallel in a row direction (x direction in FIG. 1) at a predetermined pitch, and a plurality of detection row wires 3 each extending in a row direction x, which are arranged in parallel in a column direction y at a predetermined pitch. A predetermined number of detection column wires 2 are electrically connected to one another commonly with connecting wires 4 at their upper ends and lower ends, to thereby form a detection column wire group 6 in a bunch. Similarly, a predetermined number of detection row wires 3 are electrically connected to one another commonly with connecting wires 5 at their left ends and right ends, to thereby form a detection row wire group 7 in a bunch. Further, a predetermined number of detection column wire groups 6 are arranged in parallel in the row direction x and a predetermined number of detection row wire groups 7 are arranged in parallel in the column direction y. Although part of the detection column wire group 6 and part of the detection row wire group 7 (hereinafter, each of the wire groups 6 and 7 is commonly referred to as a "detection wire group") are omitted in FIG. 1, as discussed later, the predetermined number of detection wire groups in each direction is eight in the first preferred embodiment. The detection wire groups are connected to terminals 10 with drawing wires 8 and 9. In FIG. 1, when the indicator touches the touch screen 1, a touch capacitance is formed between the detection column wires 2 constituting the detection wire group and the detection row wires 3 constituting the detection wire group (each of the wires 2 and 3 is hereinafter referred to as a "detection wire") and the indicator. The number of detection wire groups and the wiring pitch thereof, and the number of detection wires constituting the detection wire group, the wire width and the wiring pitch thereof are appropriately selected depending on the required resolution of a touch position (touch coordinate value) of the touch panel.

If the detection wire group is constituted of one detection wire as solid wiring, instead of being constituted of a plurality of detection wires, a large touch capacitance can be ensured, but when the touch panel is disposed on the front surface of a display panel and used, the detection wire group becomes a hindrance to transmission of display light, to thereby decrease the transmittance of the display light. Then, in the first preferred embodiment, the detection wire group is constituted of a plurality of detection wires and the area of a slit-like opening between the detection wires is set to be large, whereby the decrease in the transmittance of the display light is suppressed. By accepting the problem of the decrease in the transmittance of the display light, however, the configuration in which each detection wire group is constituted of one detection wire as solid wiring may be applied as a variation.

Next, with reference to FIG. 2, a layer structure of the touch screen 1 will be discussed. The upper surface layer of the touch screen 1 is a transparent substrate (hereinafter, referred to as a "base substrate") 12 formed of a transparent glass material or a transparent resin, and on the back surface of the base substrate 12, formed are the detection column wires 2 each of which is formed of a transparent wire material such as ITO. Further, a transparent interlayer insulating film 13 of SiN (silicon nitride) or the like is so formed therebelow to cover the detection column wires 2, and on the back surface of the interlayer insulating film 13, formed are the detection row wires 3 each of which is formed of a transparent wire material. Furthermore, like the interlayer insulating film 13, a transparent protection film 14 of SiN or the like is formed therebelow. There may be another structure wherein the respective arrangement positions of the detection column wires 2 and the detection row wires 3 are reversed, and specifically, the detection row wires 3 are formed on the back surface of the base substrate 12 and the detection column wires 2 are formed on the back surface of the interlayer insulating film 13.

The detection wire may be formed of a metal wire material such as aluminum, instead of being a transparent wire formed of a transparent wire material such as ITO. In this case, as discussed above, the detection wire group is constituted of a plurality of detection wires and the area of the slit-like opening between the detection wires is set to be large, whereby the transmittance of the display light can be ensured.

Figure 3:
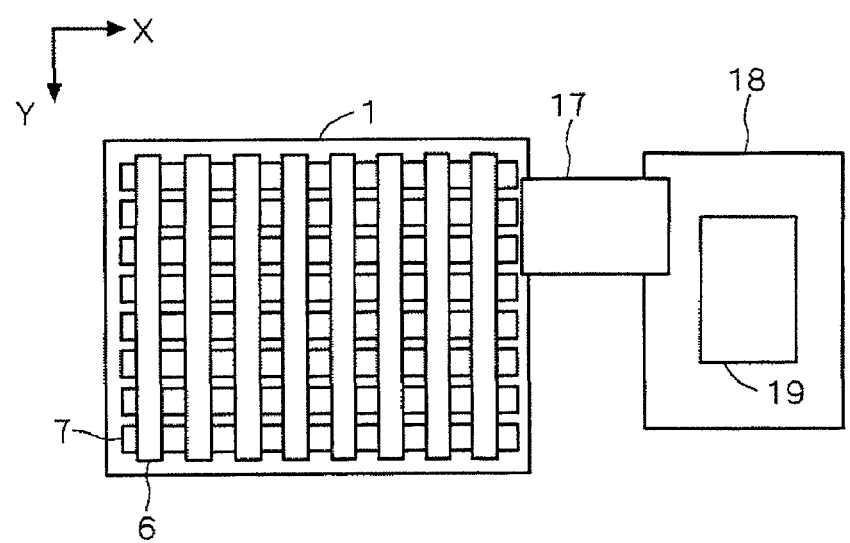
FIG. 3 is a view showing an overall structure of the touch panel in accordance with the first preferred embodiment of the present invention.

FIG. 3 is a view schematically showing an overall structure of the touch panel of the first preferred embodiment. On the terminals 10 (not shown in FIG. 3, see FIG. 1) of the touch screen 1, terminals of an FPC (Flexible Printed Circuit) 17 are mounted by using an ACF (Anisotropic conductive Film) or the like. The end portion of the detection wire group of the touch screen 1 is electrically connected to a controller substrate 18 through the FPC 17, whereby the panel shown in FIG. 3 serves as a touch panel. On the controller substrate 18, mounted is a detection circuit 19 for calculating touch coordinates on the touch screen 1 which indicate the touch position of the indicator on the basis of the result of detection of the touch capacitance. The values of the touch coordinates on the touch screen 1 which indicate the touch position of the indicator which is calculated by the detection circuit 19 are outputted as detected coordinate data to an external computer (not shown) or the like.

Figure 4:
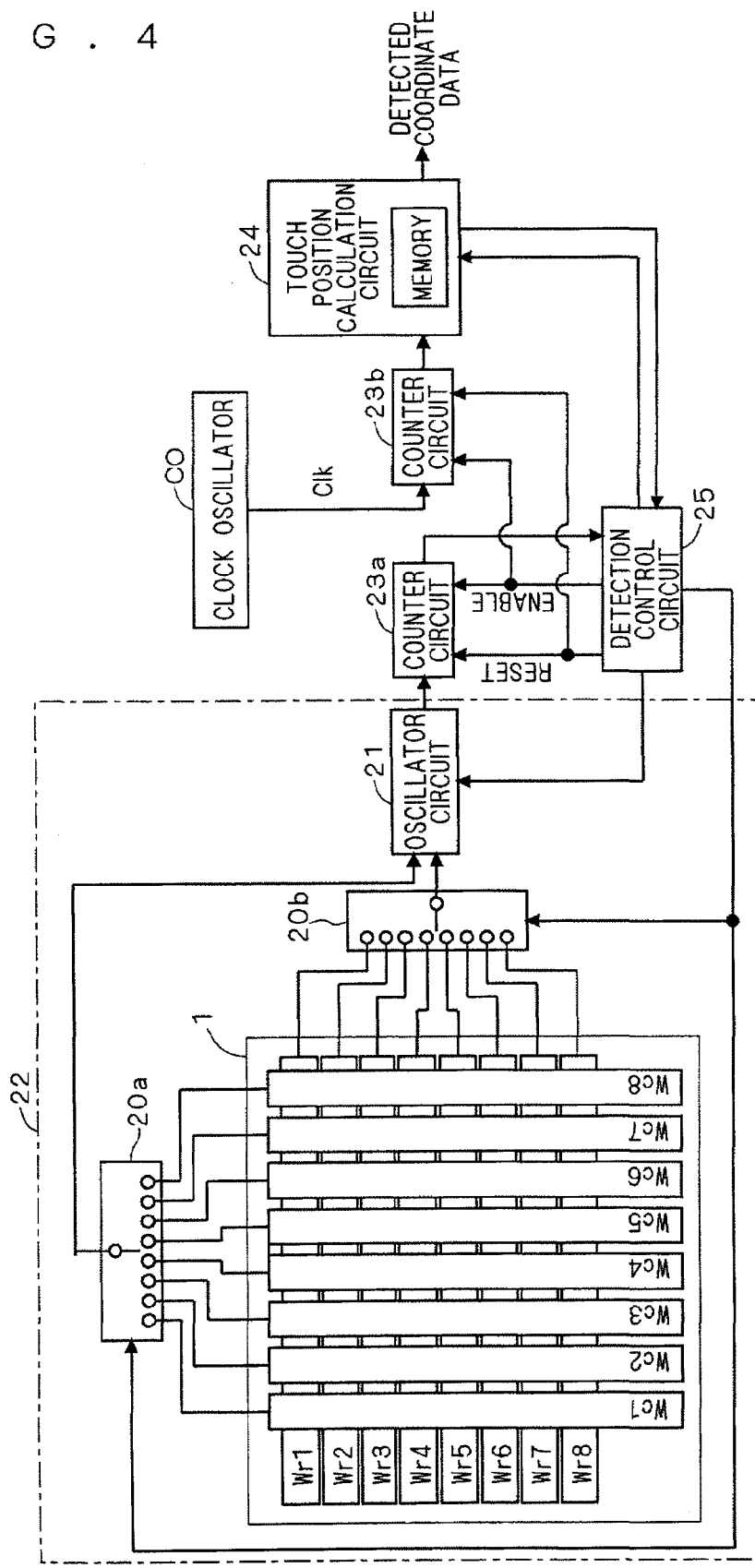
FIG. 4 is a block diagram showing a construction of a circuit system for detecting and calculating the touch position on the touch panel in accordance with the first preferred embodiment of the present invention.

FIG. 4 is a block diagram showing a circuit configuration of a touch operation detection/touch coordinate calculation system in the touch panel of the first preferred embodiment. In the first preferred embodiment, discussion will be made on an exemplary case where the number of detection column wire groups 6 and the number of detection row wire groups 7 are each eight (detection column wire groups Wc1 to Wc8 and detection row wire groups Wr1 to Wr8 in FIG. 4).

In FIG. 4, the detection circuit 19 of FIG. 3 is constituted of first switching circuits 20a and 20b (hereinafter, a first column switching circuit 20a and a first row switching circuit 20b are referred to as analog multiplexer circuits 20a and 20b, respectively), an oscillator circuit 21, a first counter circuit 23a, a second counter circuit 23b, a touch position calculation circuit 24, a clock oscillator CO, and a detection control circuit 25 for controlling the above constituent elements 20a, 20b, 21, 23a, 23b, and 24. As discussed later, the touch position calculation circuit 24 outputs a detection result indicating which is the detection wire group detected in a normal detection mode to the detection control circuit 25. In response to the detection result, the detection control circuit 25 shifts the mode from the normal detection mode to a high-accuracy detection mode and controls the above constituent elements in the detection circuit 19 so that the detection circuit 19 may operate in the high-accuracy detection mode. The detection oscillator circuit 22 of FIG. 4 is constituted of the detection column wire groups 6, the detection row wire groups 7, the analog multiplexer circuits 20a and 20b, and the oscillator circuit 21.

One end (the upper end in FIG. 4) of each of the detection column wire groups 6 is connected to the analog multiplexer circuit 20a which switches the connection from eight to one. Similarly, one end (the right end in FIG. 4) of each of the detection row wire groups 7 is connected to the analog multiplexer circuit 20b which switches the connection from eight to one. Then, respective output ends of the analog multiplexer circuits 20a and 20b are commonly connected to an input end of the oscillator circuit 21. Each of the analog multiplexer circuits 20a and 20b selects its connection in response to a command of a control signal outputted from the detection control circuit 25 and sequentially switches the connection between the detection wire group and the oscillator circuit 21 one by one.

An output end of the oscillator circuit 21 is connected to an input end of the first counter circuit 23a and an oscillation output signal outputted from the oscillator circuit 21 is inputted to the first counter circuit 23a. The first counter circuit 23a counts the oscillation output signal outputted from the oscillator circuit 21 in accordance with the rise timings of a RESET signal outputted from the detection control circuit 25 and an ENABLE signal following the RESET signal and outputs a count value to the detection control circuit 25 one by one. The detection control circuit 25 holds data of a predetermined count value and compares the count value inputted from the first counter circuit 23a with the above predetermined count value. At the timing when the inputted count value becomes equal to the predetermined count value, the detection control circuit 25 causes the ENABLE signal to fall. In accordance with the timing when the output of the ENABLE signal is stopped or the ENABLE signal falls, the first counter circuit 23a stops the operation of counting the oscillation output signal outputted from the oscillator circuit 21. In other words, the first counter circuit 23a counts the oscillation output signal from the time when the first oscillation output signal after the RESET signal is inputted from the oscillator circuit 21 to the time when the count value becomes equal to the predetermined count value. Further, in accordance with the rise (output) timings of the RESET signal and the ENABLE signal outputted from the detection control circuit 25, the second counter circuit 23b succeeding the first counter circuit 23a starts counting the pulse of a clock signal Clk which is outputted from the clock oscillator CO and has an arbitrary preset cycle. The second counter circuit 23b continues the counting of the pulse of the clock signal Clk during the period until the timing when the output of the ENABLE signal is stopped or the ENABLE signal falls. The second counter circuit 23b thereby counts a period (time) from the time when the first counter circuit 23a starts counting the oscillation output signal outputted from the oscillator circuit 21 to the time when the count value becomes equal to the above predetermined count value which the detection control circuit 25 holds. Then, the second counter circuit 23b outputs the time period counted by itself as an "oscillation cycle detection result" to the touch position calculation circuit 24 in accordance with the timing when the output of the ENABLE signal is stopped. In accordance with the timing when the output of the ENABLE signal is stopped, the detection control circuit 25 outputs a control signal for commanding the circuit 24 to capture the oscillation cycle detection result. In accordance with the timing when the control signal is inputted, the touch position calculation circuit 24 captures the oscillation cycle detection result outputted from the second counter circuit 23b and calculates the touch coordinate value which indicates the touch position of the indicator on the touch screen 1, as discussed later, on the basis of the oscillation cycle detection result.

Thus, the touch panel has a configuration wherein the electrostatic capacitance Ctc between the detection column wire group 6 and the indicator and the electrostatic capacitance Ctr between the detection row wire group 7 and the indicator are substantially calculated by the touch position calculation circuit 24 on the basis of the change of the oscillation cycle of the oscillator circuit 21 due to the touch of the indicator on the touch panel (exemplary means and method of measuring the electrostatic capacitances Ctc and Ctr).

FIG. 5 is a circuit diagram schematically showing a circuit configuration of the oscillator circuit 21 included in the touch panel of the first preferred embodiment and connection between the oscillator circuit 21 and the detection wire groups. In the first preferred embodiment, the oscillator circuit 21 uses an operational amplifier circuit 30 and comprises a second switching circuit (hereinafter, referred to as an "analog multiplexer circuit") 31 which switches the connection from two to one according to the command of the control signal from the detection control circuit 25 which is inputted to an input terminal 34. The analog multiplexer circuits 20a, 20b, and 31 are generally referred to as "switching circuits".

In FIG. 5, for convenience of understanding, only one detection column wire group 6 and one detection row wire group 7 each of which is selected from eight groups by the analog multiplexer circuit 20a or 20b and neither of the analog multiplexer circuits 20a and 20b is not shown.

In FIG. 5, "A" represents a touch position on the detection column wire group 6 (hereinafter, referred to as "touch column coordinates") and "B" represents a touch position on the detection row wire group 7 (hereinafter, referred to as "touch row coordinates"). The upper end side of the detection column wire group 6 selected by the analog multiplexer circuit 20a is connected to a connection terminal 32a of the oscillator circuit 21, and on the other hand, the right end side of the detection row wire group 7 selected by the analog multiplexer circuit 20b is connected to a connection terminal 32b. The analog multiplexer circuit 31 selects one of the two connection ends, i.e., the upper end of the detection column wire group 6 and the right end of the detection row wire group 7, and connects the selected connection end to an inverting input end of the operational amplifier circuit 30.

A resistor Ra is connected between a noninverting input end of the operational amplifier circuit 30 and the ground and a resistor Rb is connected between the noninverting input end and the output end thereof. A capacitor C1 is connected between the inverting input end of the operational amplifier circuit 30 and the ground and a resistor R1 is connected between the inverting input end and the output end thereof. Thus, a so-called relaxation oscillation circuit is configured by using the operational amplifier circuit 30. Charge/discharge to/from an output saturation voltage is performed by a detection feedback path 35 constituted of the resistor R1, the capacitor C1, the resistance of the detection column wire group 6 (or the resistance of the detection row wire group 7), and the touch capacitance Ctc (or the touch capacitance Ctr), whereby the oscillator circuit 21 oscillates. Then, the oscillation output signal is outputted from an output terminal 33.

When the analog multiplexer circuit 31 switches the connection in response to the command of the control signal from the detection control circuit 25, which is inputted to the terminal 34, the connection with the inverting input end of the operational amplifier circuit 30 is switched between the connection terminals 32a and 32b. By switching the connection of the second switching circuit 31 as discussed above, one of the two connection ends, i.e., the upper end of the detection column wire group 6 and the right end of the detection row wire group 7 is electrically connected to the inverting input end of the operational amplifier circuit 30. In other words, the detection wire group selected by the second switching circuit 31 becomes a constituent element of the detection feedback path 35, whereby the detection oscillator circuit 22 (FIG. 4) including the selected detection wire group is formed. If each of the analog multiplexer circuits 20a and 20b has an enable function that inhibits conduction to any input, the analog multiplexer circuit 31 is not needed.

With such a configuration as above, when the indicator touches the touch screen 1 and the indicator comes close to the detection column wire group 6 to generate the touch capacitance Ctc or the indicator comes close to the detection row wire group 7 to generate the touch capacitance Ctr, the transfer characteristics of the detection feedback path 35 change and the oscillation cycle of the detection oscillator circuit 22 (=the oscillation cycle of the oscillator circuit 21) increases as compared with the case where no touch capacitance Ctc or Ctr is generated (the case where the indicator does not touch the touch screen 1). Then, as discussed later, by substantially detecting the touch capacitance Ctc or Ctr from the change of the oscillation cycle, it becomes possible to calculate the touch coordinate value which indicates the touch position of the indicator on the touch screen 1.

The oscillation cycle Tc of the oscillator circuit 21 alone without the detection feedback path 35 is generally given as expressed by Eq. (1), and the oscillation cycle Tc is proportional to the time constant τ of the resistor R1 and the capacitor C1.

$$Tc = 2\tau \cdot \ln((1+k)/(1-k))$$ Eq. (1)

where
τ=R1·C1
k=Ra/(Ra/(Ra+Rb)
(R1, C1, Ra, and Rb represent respective resistance values and electrostatic capacitance values of the elements)

In the detection oscillator circuit 22 including the detection feedback path 35, when the touch capacitances Ctc and Ctr are formed by the touch of the indicator on the touch screen 1, the above time constant τ is increased by the detection feedback path 35 which is electrically connected to the inverting input end of the operational amplifier circuit 30 and the oscillation cycle of the oscillator circuit 21 also increases. The change of the oscillation cycle is used for the detection of the touch capacitance, i.e., the detection of the touch coordinate value on the touch screen 1 which indicates the touch position.

Herein, under the control of the detection control circuit 25, the preceding first counter circuit 23a counts the output signal of the detection oscillator circuit 22 (=the output signal of the oscillator circuit 21) until the count value becomes equal to a predetermined count value CP (this counting operation makes it possible to smooth the effect of an extraneous noise and the like and increase the accuracy of the measurement as discussed later), and further under the control of the detection control circuit 25, the succeeding second counter circuit 23b counts the time period from the time when the first counter circuit 23a starts counting to the time when the count value becomes equal to the predetermined count value CP (=(the oscillation cycle of the output signal of the detection oscillator circuit 22)×(the predetermined count value CP)), whereby the oscillation cycle of the output signal of the detection oscillator circuit 22 is detected (the value obtained by dividing the counted period by the predetermined count value CP is the oscillation cycle of the output signal of the detection oscillator circuit 22).

In this case, if an extraneous noise from a peripheral device such as a display device or the like used in combination with the touch panel or a random noise from a circuit element itself such as the analog multiplexer circuit or the like is mixed into a connection path to the oscillator circuit 21, which includes the detection column wire group 6, the detection row wire group 7, and the drawing wires 8 and 9, there arises fluctuation in an oscillation frequency and the accuracy of the detected capacitance value decreases. On the other hand, the predetermined count value CP up to which the first counter circuit 23a counts is the number of accumulation of the oscillation cycle of the oscillator circuit 21. Specifically, since the extraneous noise and the random noise are asynchronous with the oscillation of the oscillator circuit 21, when the predetermined count value CP is set to be a large value, the effect of the extraneous noise and the like is smoothed and decreased by accumulation and the accuracy of detection of the capacitance value increases. The time period until the count value of the first counter circuit 23a becomes equal to the predetermined count value CP, which is counted by the second counter circuit 23b, is expressed by (oscillation cycle)×(predetermined count value CP).

Accordingly, a detection value obtained as a counting result of the second counter circuit 23b is expressed by (oscillation cycle)×(predetermined count value CP)×(frequency of counting clock Clk). Therefore, the detection value is proportional to the predetermined count value CP, and the larger the predetermined count value CP becomes, the larger the detection value with respect to the same electrostatic capacitance, i.e., the electrostatic capacitance detection sensitivity becomes.

On the other hand, though the touch coordinates can be obtained by interpolation, in terms of the detection accuracy or the detection sensitivity, if the predetermined count value CP is set to be larger, the accuracy of interpolation, i.e., the accuracy of touch coordinates can be also increased.

If the predetermined count value CP is set to be a large value, however, the time required for detection by one detection wire group also increases and it therefore becomes difficult to satisfy a desired response time of the touch panel. In a case where a large number of detection wire groups are provided, this tendency becomes further remarkable. In the first preferred embodiment, attention is paid to this problem in a trade-off relation, and in order to utilize this problematic point, the calculation of the touch coordinates which indicate the touch position on the touch screen 1 (the detection therefor of the touch capacitances Ctc and Ctr) is achieved by performing two-stage detecting operations in the normal detection mode and the high-accuracy detection mode and then performing interpolation.

In the first preferred embodiment, for simple illustration, the parasitic electrostatic capacitances on the detection wire groups, the drawing wires 8 and 9 and the other circuit wiring and the electrostatic capacitances viewed from the input/output ends of the switching circuits (the electrostatic capacitances inside the analog multiplexer circuits 20a, 20b, and 31) are not shown in figures. Actually, since circuit parameters such as a resistance value and the like are selected in consideration of these electrostatic capacitances, these electrostatic capacitances have no effect on an essential part of this preferred embodiment.

Figure 6:
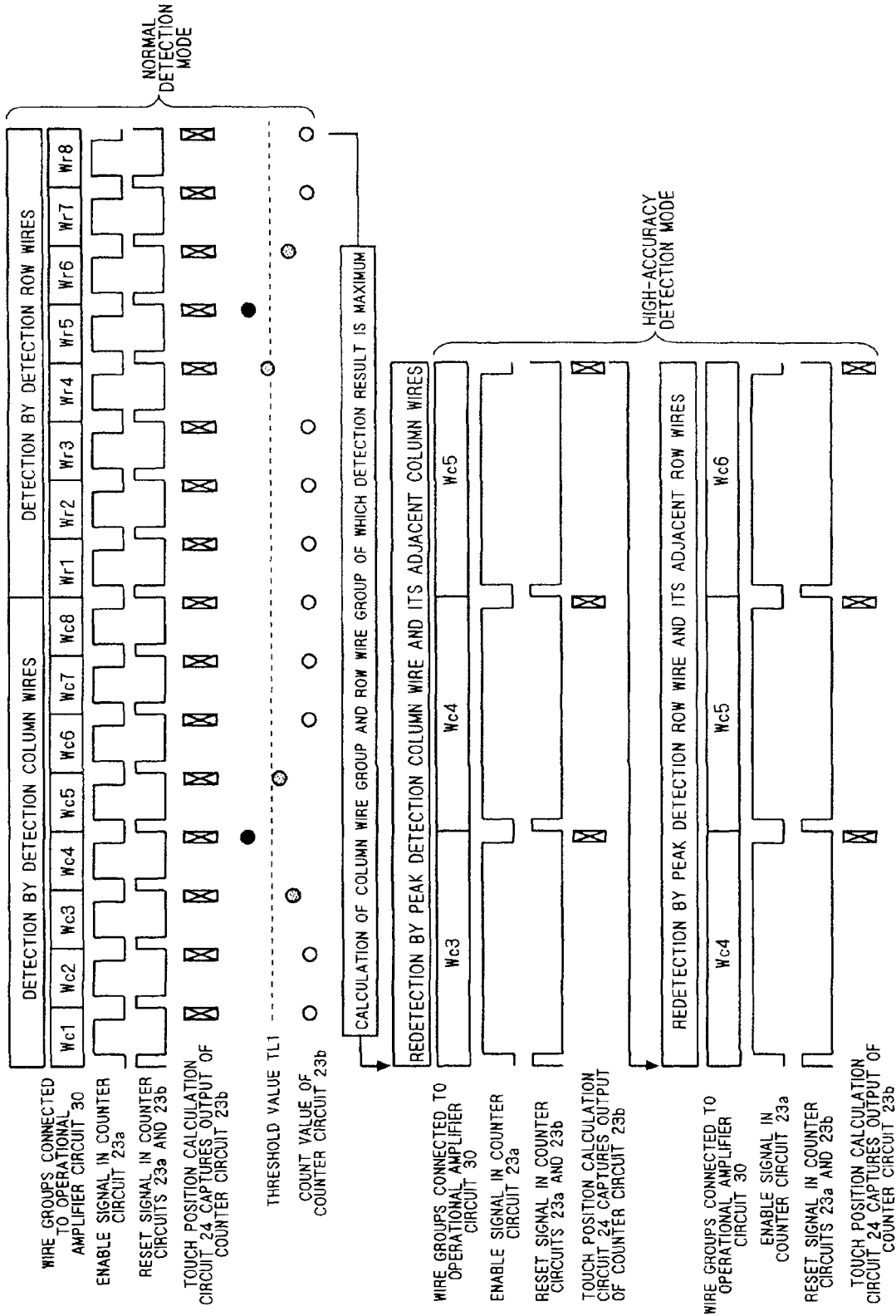
FIG. 6 is a timing chart showing operations of detecting and calculating in the touch panel in accordance with the first preferred embodiment of the present invention.

Next, with reference to FIGS. 4 to 10, an operation for detecting the touch coordinate value on the touch screen 1 which indicates the touch position will be discussed. FIG. 6 is a timing chart showing an operation of the touch panel of the first preferred embodiment.

The outline of the operation for detecting the touch coordinates is as follows. (1) In ordinary cases, repeated is an operation in the "normal detection mode" wherein the predetermined count value CP up to which the first counter circuit 23a counts is set in the detection control circuit 25 as a predetermined count value CPL having a relatively small value. (2) In the normal detection mode, when the touch position calculation circuit 24 determines that there is a touch, the detection control circuit 25 resets the predetermined count value CP as a predetermined count value CPH which is larger than the predetermined count value CPL and then shifts the mode to the "high-accuracy detection mode". (3) The touch position calculation circuit 24 performs interpolation by using a detection result obtained in the high-accuracy detection mode, to thereby calculate accurate touch coordinates and send out the touch coordinates to the outside. (4) A "background detection mode" wherein the count value (hereinafter, referred to as a "background detection value") of the second counter circuit 23b, which serves as a reference of interpolation in the case where there is no touch, is detected is performed as appropriate at the initial time and at some midpoint in an operation of the "normal detection mode".

First, in the normal detection mode, when the control signal for commanding the switching to the "a" side, which is outputted from the detection control circuit 25, is inputted to the terminal 34 of the oscillator circuit 21, the analog multiplexer circuit 31 switches its connection to the "a" side in FIG. 5, to thereby select the detection column wire group 6 to be detected. Next, the detection control circuit 25 outputs the control signal for commanding the sequential switching of the eight detection column wire groups 6 to the analog multiplexer circuit 20a, and in response to the control signal, the analog multiplexer circuit 20a sequentially switches its output terminals to thereby select one column wire group to be detected out of the eight detection column wire groups 6 as shown in FIG. 6 and connects the upper end of the selected detection column wire group 6 to the connection terminal 32a of the oscillator circuit 21 in the order of Wc1→Wc2→ . . . Wc7→Wc8. Consequently; the upper end of the selected detection column wire group 6 is connected to the inverting input end of the operational amplifier circuit 30.

In conjunction with the operation for switching the detection wire group to be connected to the oscillator circuit 21, the first counter circuit 23a starts counting the oscillation output signal of the detection oscillator circuit 22 at the point of time when the RESET signal from the detection control circuit 25 is released and the ENABLE signal outputted from the detection control circuit 25 becomes an active level (see FIG. 6) and the first counter circuit 23a continues the counting until the count value becomes the predetermined count value CPL. At the time when the detection control circuit 25 detects that the count value outputted from the first counter circuit 23a becomes the predetermined count value CPL, the detection control circuit 25 sets the ENABLE signal to an inactive level and stops the counting operation of the first counter circuit 23a.

On the other hand, the succeeding second counter circuit 23b counts the time period while the ENABLE signal outputted from the detection control circuit 25 is at the active level according to the counting clock signal Clk. In other words, the count value of the second counter circuit 23b indicates the time period from the time when the first counter circuit 23a starts the counting operation to the time when the count value thereof becomes the predetermined count value CPL. Therefore, the count value CV1 of the second counter circuit 23b is a value obtained by accumulating the oscillation cycle of the detection oscillator circuit 22 by the predetermined count value CPL and averaging the accumulated value. After setting the ENABLE signal to the inactive level, the detection control circuit 25 outputs the control signal for commanding the reading of the count value CV1 of the second counter circuit 23b to the succeeding touch position calculation circuit 24. In according to the timing of inputting the control signal, the touch position calculation circuit 24 reads the oscillation cycle detection result CV1 outputted from the second counter circuit 23b at the timing shown in FIG. 6.

Similarly, the detection control circuit 25 issues the control signal to be inputted to the input terminal 34, to thereby switch the connection of the analog multiplexer circuit 31 of the oscillator circuit 21 from the "a" side to the "b" side in FIG. 5. The detection control circuit 25 thereby selects the detection row wire group 7 to be detected and outputs the control signal for commanding the sequential switching of the eight detection row wire groups 7 to the analog multiplexer circuit 20b. In response to the control signal, the analog multiplexer circuit 20b sequentially switches its output terminals to thereby select one row wire group to be detected out of the eight detection row wire groups 7 as shown in FIG. 6 and connects the right end of the selected detection row wire group 7 to the inverting input end of the operational amplifier circuit 30 of the oscillator circuit 21 in the order of Wr1→Wr2→ . . . Wr7→Wr8. Then, similarly, the detection control circuit 25 releases the RESET signal and changes the level of the ENABLE signal to the active level, and the first and second counter circuits 23a and 23b detects the accumulated value CV1 with respect to each detection row wire group 7, which is obtained by accumulating the oscillation cycle of the detection oscillator circuit 22 by the predetermined count value CPL.

Though detailed discussion will be made later with reference to the flowchart, when the count value CV1 of the second counter circuit 23b with respect to one or more detection column wire groups 6 and the count value CV1 of the second counter circuit 23b with respect to one or more detection row wire groups 7 are each equal to or larger than a predetermined threshold value (a first threshold value) TL1 (CV1≧TL1), the touch position calculation circuit 24 determines that there is a touch of the indicator. Then, for the interpolation process discussed later, the touch position calculation circuit 24 extracts the column wire group of which the count value CV1 is maximum out of the detection column wire groups 6 of which the count value CV1 is equal to or larger than the threshold value TL1 and extracts the row wire group of which the count value CV1 is maximum out of the detection row wire groups 7 of which the count value CV1 is equal to or larger than the threshold value TL1, and sends information on the extracted column wire group and row wire group to the detection control circuit 25. Receiving the extraction result, the detection control circuit 25 increases the detection accuracy with respect to the extracted column wire group and row wire group and two adjacent wire groups of each of the column wire group and the row wire group by resetting the predetermined count value CP to the predetermined count value CPH which is larger than the predetermined count value CPL set in the normal detection mode and shifts the mode to the "high-accuracy detection mode" wherein detection of the accumulated value CV1 is performed again on the extracted column wire group and row wire group and the two adjacent wire groups of each of the column wire group and the row wire group. FIG. 6 shows an exemplary case of the "high-accuracy detection mode" wherein the column wire group Wc4 is the column wire group of which the count value CV1 is the maximum value and the row wire group Wr5 is the row wire group of which the count value CV1 is the maximum value (in other words, the extracted column wire group and row wire group).

On the other hand, when the count value CV1 of the second counter circuit 23b with respect to any one of the detection column wire groups and the count value CV1 of the second counter circuit 23b with respect to any one of the detection row wire groups are smaller than the predetermined threshold value TL1, the touch position calculation circuit 24 determines that there is no touch of the indicator and sends the determination result to the detection control circuit 25. Receiving the determination result, the detection control circuit 25 controls the constituent elements to repeat the operation of the "normal detection mode". Thus, the operation of the "normal detection mode" is repeated.

Figure 7:
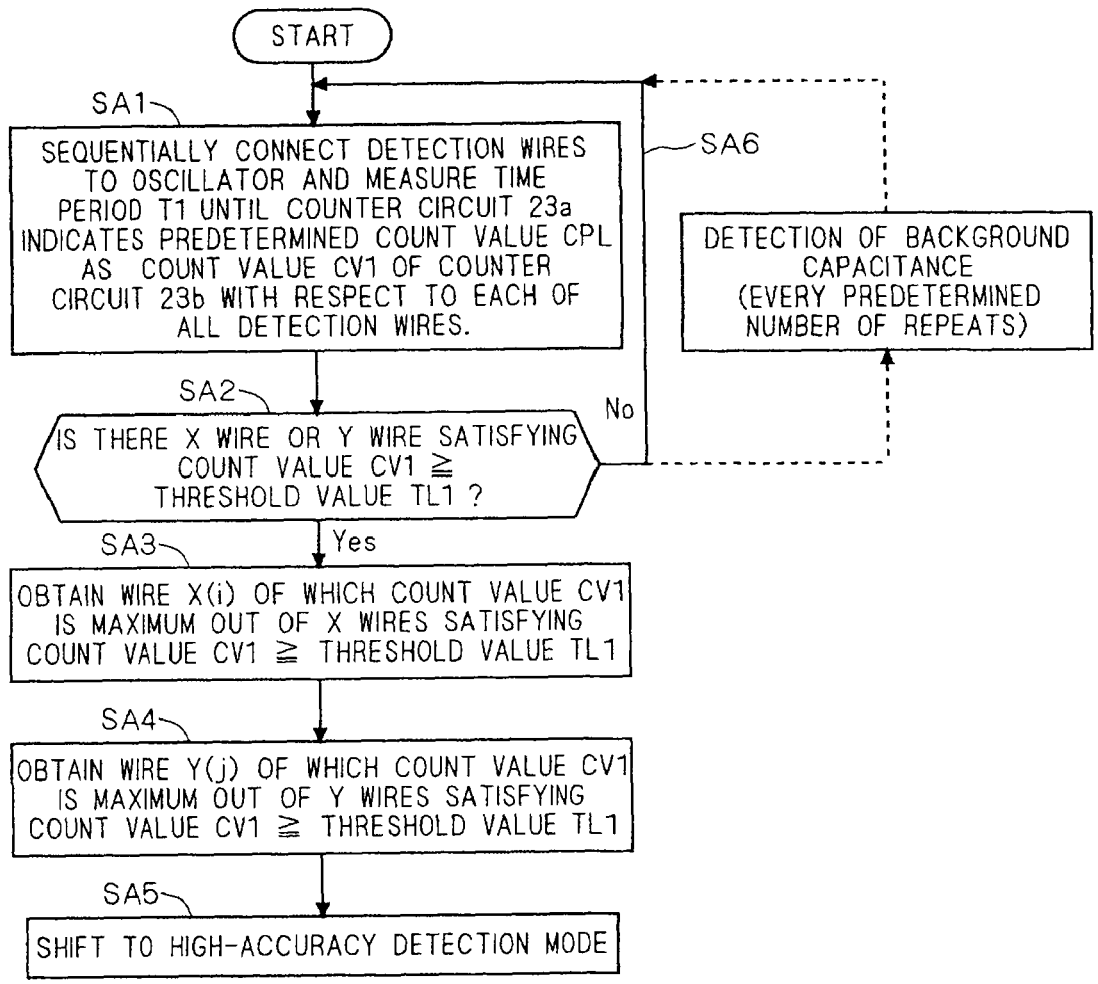
FIG. 7 is a flowchart showing an operation flow in a normal detection mode in the touch panel in accordance with the first preferred embodiment of the present invention.

An operation flow of the "normal detection mode" is shown in the flowchart of FIG. 7. The detection column wire group is also referred to as an "X wire" for detecting the x coordinate of the touch coordinates and the detection row wire group is also referred to as a "Y wire" for detecting the y coordinate of the touch coordinates. Each of the detection column wire group and the detection row wire group is also referred to simply as a "detection wire" hereinafter.

First, the detection wires are sequentially connected to the oscillator circuit 21 and a time period t1 until the count value of the first counter circuit 23a becomes the predetermined count value CPL is measured as the count value CV1 of the second counter circuit 23b with respect to each of all the detection wires. The touch position calculation circuit 24 captures the count value CV1 of each detection wire (Step SA1).

Next, the touch position calculation circuit 24 determines if there is an X wire or a Y wire satisfying CV1≧TL1 on the basis of the count value CV1 captured therein for each of the detection wires (Step SA2).

If there is an X wire or a Y wire which satisfies such a relation as above, the touch position calculation circuit 24 obtains the X wire X(i) of which the count value CV1 is the maximum value out of the X wires (Step SA3). Similarly, the touch position calculation circuit 24 obtains the Y wire Y(j) of which the count value CV1 is the maximum value out of the Y wires (Step SA4). Then, the touch position calculation circuit 24 sends information on the X wire X(i) and the Y wire Y(j) of which the count value CV1 is the maximum value to the detection control circuit 25. Receiving the information, the detection control circuit 25 resets the predetermined count value CP to the count value CPH and then shifts the detection mode for the wires X(i−1), X(i), X(i+1), Y(j−1), Y(j), and Y(j+1) from the "normal detection mode" to the "high-accuracy detection mode" (Step SA5).

On the other hand, if there is no X wire or Y wire which satisfies the count value CV1≧the threshold value TL1, the detection control circuit 25, which receives the determination result from the touch position calculation circuit 24, repeats the operation of the "normal detection mode" (Step SA6).

After shifting the mode to the "high-accuracy detection mode", the detection control circuit 25 resets the predetermined count value CP for the first counter circuit 23a to the predetermined count value CPH (the second detection accuracy) which is larger than the predetermined count value CPL (the first detection accuracy) used in the "normal detection mode", as discussed above. FIG. 6 shows an exemplary case where the predetermined count value CPH is four times as large as the predetermined count value CPL in the "normal detection mode".

Then, under the control of the detection control circuit 25, the column wire group of which the count value CV1 of the second counter circuit 23b is the maximum value out of the detection column wire groups of which the count values CV1 are each equal to or larger than the threshold value TL1 and the column wire groups adjacent thereto (in FIG. 6, the detection column wire group Wc4 and the two adjacent detection column wire groups Wc3 and Wc5) are sequentially connected to the oscillator circuit 21 and respective capacitance values by these column wire groups are detected as count values CV2 of the second counter circuit 23b.

Similarly, under the control of the detection control circuit 25, the row wire group of which the count value CV1 of the second counter circuit 23b is the maximum value out of the detection row wire groups of which the count values CV1 are each equal to or larger than the threshold value TL1 and the two row wire groups adjacent thereto (in FIG. 6, the detection row wire group Wr5 and the two adjacent detection row wire groups Wr4 and Wr6) are sequentially connected to the oscillator circuit 21 and respective capacitance values by these row wire groups are detected as count values CV2 of the second counter circuit 23b.

Figure 8:
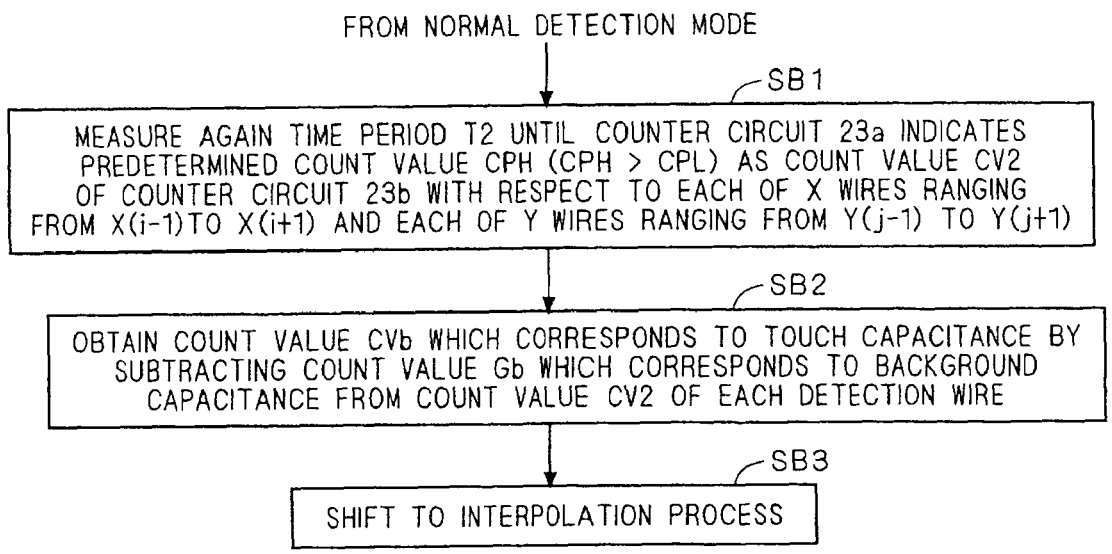
FIG. 8 is a flowchart showing an operation flow in a high-accuracy detection mode in the touch panel in accordance with the first preferred embodiment of the present invention.

Herein, an operation flow of the "high-accuracy detection mode" is shown in the flowchart of FIG. 8.

First, according to the command of the control signal outputted from itself, the detection control circuit 25 sequentially connects the X wire X(i) (hereinafter, referred to also as a "peak wire") of which the count value CV1 is the maximum value out of the X wires of which the count values CV1 of the second counter circuit 23b are each equal to or larger than the threshold value TL1 and the X wires (X(i−1), X(i+1)) adjacent thereto and the Y wire Y(j) of which the count value CV1 not smaller than the threshold value TL1 is the maximum value out of the Y wires and the Y wires (Y(j−1), Y(j+1)) adjacent thereto to the oscillator circuit 21, and the second counter circuit 23b measures again a time period t2 until the first counter circuit 23a indicates the predetermined count value CPH as its count value CV2 (Step SB1).

Next, the touch position calculation circuit 24 having captured the count value CV2 according to the control of the detection control circuit 25 calculates a count value CVb which corresponds to the touch capacitance with respect to each detection wire by subtracting a background detection value Gb (discussed later) of the corresponding detection wire from the count value CV2 of the detection wire (Step SB2). Then, the touch position calculation circuit 24 shifts the process to the "interpolation process" (Step SB3).

Figure 9:
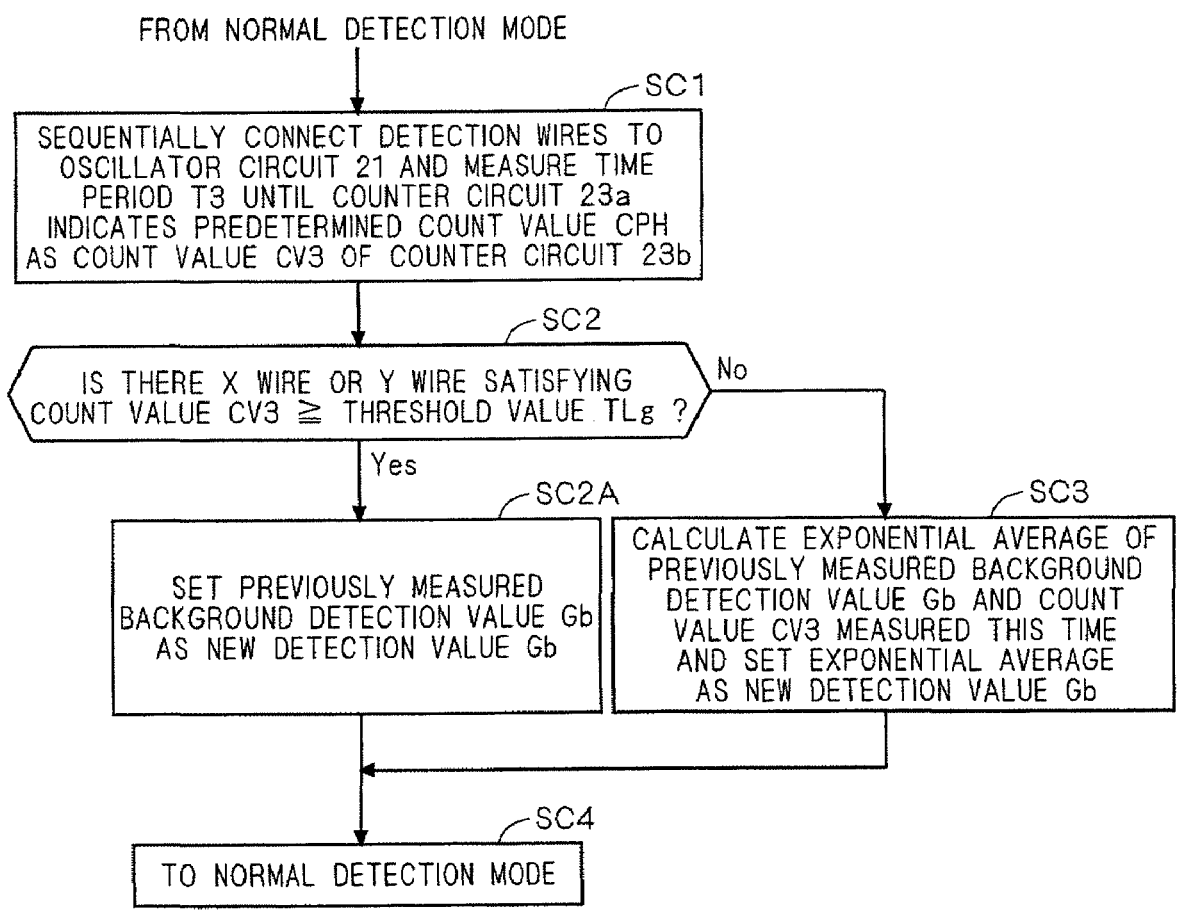
FIG. 9 is a flowchart showing an operation flow in a background detection mode in the touch panel in accordance with the first preferred embodiment of the present invention.

Herein, the flowchart of FIG. 9 shows an operation flow of the "background detection mode" for detecting the background detection value (which corresponds to an offset value) discussed above and shown in FIG. 7. The "background detection mode" is performed when the determination result of Step SA2 in the "normal detection mode" of FIG. 7 is "No" and at some midpoint in repetition of the "normal detection mode" and the detection of the background detection value Gb is performed every time when the "normal detection mode" is repeated a predetermined number of times. At the initial time of starting the operation, the detection control circuit 25 sets the initial value of the background detection value to the touch position calculation circuit 24. Since the background detection value Gb is used in the interpolation process discussed later, in the "background detection mode", the detection control circuit 25 sets the predetermined count value CP for the first counter circuit 23a to the predetermined count value CPH (the third detection accuracy) which is a value as large as that used in the "high-accuracy detection mode" and then detection of the background detection value Gb is performed with high accuracy. In the first preferred embodiment, the reason why the "background detection mode" is not performed every time when the "normal detection mode" is repeated is because the detection time in the "high-accuracy detection mode" is longer and becomes dead time for detection of touch coordinates and this raises the possibility of affecting the response time. Since the background detection value Gb does not change sharply, there is generally no problem if the interval of detection is thus set to be wide.

In response to the control command of the detection control circuit 25, the analog multiplexer circuits 20a, 20b, and 31 sequentially connect the detection wires to the inverting input end (−) of the operational amplifier circuit 30 in the oscillator circuit 21. The second counter circuit 23b measures a time period t3 until the first counter circuit 23a indicates the predetermined count value CPH as a count value CV3 (offset detection signal) and sends the count value CV3 to the touch position calculation circuit 24 (Step SC1).

Next, the touch position calculation circuit 24 determines if the count value CV3≧a threshold value TLg for each detection wire (Step SC2).

Then, if it is determined that there is a detection wire satisfying the count value CV3≧the threshold value TLg, the touch position calculation circuit 24 does not update the background detection value Gb(old) set in the execution of the previous "background detection mode" and sets the value Gb(old) as a background detection value Gb(new) measured this time (Step SC2A).

On the other hand, if it is determined that there is no detection wire satisfying the above relation, the touch position calculation circuit 24 calculates an exponential average of the background detection value Gb(old) detected in the previous "background detection mode" and the count value CV3 measured this time and stores the calculated value as the new background detection value Gb(new) into a memory in the circuit 24 (Step SC3).

The exponential average is obtained by using Eq. (2) below.

$$Gb(\text{new})=\alpha \cdot Gb(\text{old})+(1-\alpha)\cdot CV3 \qquad \text{Eq. (2)}$$

where $0<\alpha<1$

In order to suppress a detection error of the background detection value and increase the accuracy of interpolation, herein, smoothing is made by, for example, the exponential average. The value of "α" may be set appropriately in consideration of the degree of variation in the background detection value and the like due to the use environment.

Next, the "interpolation process" performed by the touch position calculation circuit 24 will be discussed. Herein, for simple discussion, it is assumed that there is no deviation among the count values CVb of all the detection wires.

FIG. 10 is a view showing an example of variation in the count values CVb detected in the "high-accuracy detection mode" depending on the touch positions. In FIG. 10, reference sign "FG" represents a finger which touches the touch panel. With the center of the X wire X(i) and the Y wire Y(j) of which the count value CV2 obtained by the second counter circuit 23b is maximum as a point of origin, FIG. 10 shows a relation of the count value (relative value) CVb with respect to the displacement amount (relative value) of the finger PG which touches horizontally in the case of the X wire or vertically in the case of the Y wire from the center position (wherein the case of the wires X(i) and Y(j) is indicated by a solid line, the case of the wires X(i−1) and Y(j−1) is indicated by a dotted line, and the case of the wires X(i+1) and Y(j+1) is indicated by a one-dot chain line). FIG. 10 is a view in the case where the touch size of the finger FG (the size of a touched area), the wire width (the width of wire group), and the pitch of wire groups are set to almost equal value p. Though there arises variation in the touch size of the finger FG depending on a user or the degree of touch, it can be thought that as an ordinary touch size of the finger FG, both the width and the length are each about 10 mm.

As shown in FIG. 10, in the case of the wires X(i) and Y(j), as the center of finger position is displaced from the center of the wire, the count values CVb(i) and CVb(j) gradually decrease. When the center of finger position moves to almost the center (p/2 (p: wiring pitch)) of the respective centers of adjacent wires, in the case of rightward displacement or upward displacement, the count values CVb(i) and CVb(j) becomes almost the same as the count values CVb(i+1) and CVb(j+1) obtained by the adjacent wires X(i+1) and Y(j+1). Also in the case of leftward displacement or downward displacement, the count values CVb(i) and CVb(j) becomes almost the same as the count values CVb(i−1) and CVb(j−1) obtained by the adjacent wires X(i−1) and Y(j−1). When the displacement amount becomes larger than this, since the count values obtained by the adjacent wires become larger, it can be thought, in terms of interpolation, that the touch coordinates has only to be interpolated with respect to the displacement amount up to p/2.

Figure 11:
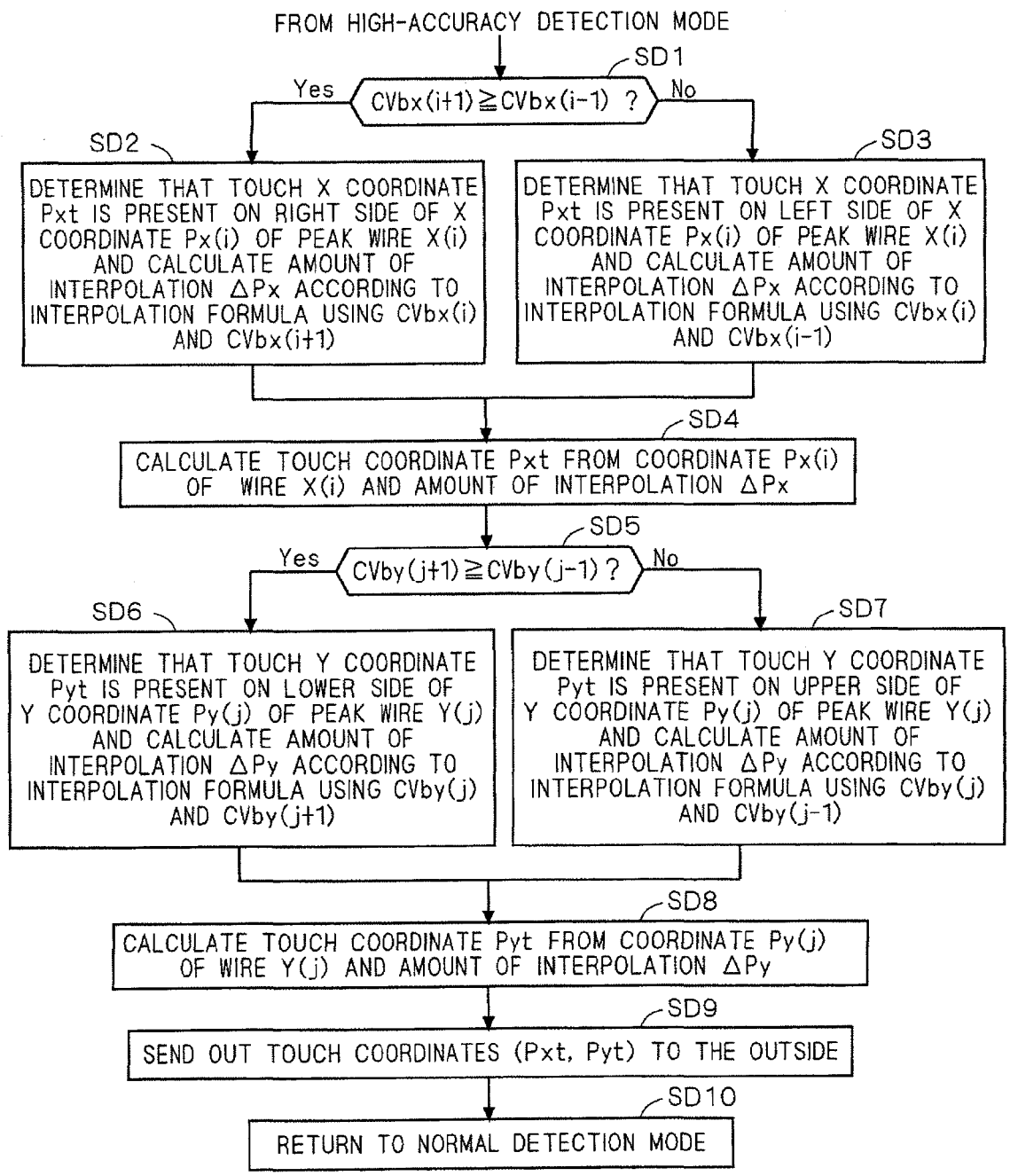
FIG. 11 is a flowchart showing an operation flow of interpolation in the touch panel in accordance with the first preferred embodiment of the present invention.

Next, an operation flow of "interpolation process" of the first preferred embodiment will be discussed with reference to the flowchart of FIG. 11.

The touch position calculation circuit 24 performs interpolation by using respective count values CVbx(i), CVbx(i−1), CVbx(i+1), CVby(j), CVby(j−1), and CVby(j+1) of the peak wire X(i) and its adjacent wires X(i−1) and X(i+1) among the X wires and the peak wire Y(j) and its adjacent wires Y(j−1) and Y(j+1) among the Y wires all of which are measured in the "high-accuracy detection mode". Herein, it is defined that the wire number i increases from left to right and the wire number j increases from up to down.

First, as an operation for calculating a touch X coordinate Pxt, the touch position calculation circuit 24 determines if the relation between the detection values of the wires adjacent to the peak wire is CVbx(i+1)≧CVbx(i−1) and thereby determines whether the touch position is present on the left side or the right side of the peak X wire X(i) (Step SD1).

If CVbx(i+1)≧CVbx(i−1), the touch position calculation circuit 24 determines that the touch position (touch X coordinate Pxt) is present on the right side of the X coordinate Px(i) of the peak X wire X(i) and calculates the amount of interpolation ΔPx by using Eq. (3) (Step SD2).

$$\Delta Px = f(CVbx(i), CVbx(i+1)) \qquad \text{Eq. (3)}$$

(f( ): interpolation formula)

The interpolation formula will be discussed later.

On the other hand, if CVbx(i+1)<CVbx(i−1), the touch position calculation circuit 24 determines that the touch position (touch X coordinate Pxt) is present on the left side of the X coordinate Px(i) of the peak X wire X(i) and calculates the amount of interpolation ΔPx by using Eq. (4) (Step SD3).

$$\Delta Px = f(CVbx(i), CVbx(i-1)) \qquad \text{Eq. (4)}$$

Then, the touch position calculation circuit 24 calculates the touch X coordinate Pxt from the X coordinate Px(i) of the peak X wire X(i) and the amount of interpolation ΔPx by using Eqs. (5) and (6) (Step SD4). The X coordinate Px(i) of each detection wire i and the Y coordinate Py(j) of each detection wire j, i.e., the coordinates of the center position of each detection wire group, are automatically determined by the touch position calculation circuit 24 if the value of the i-th detection wire and the value of the j-th detection wire are specifically determined by a fixed position coordinate system which is predetermined according to the size of the touch screen 1. The touch position calculation circuit 24 holds data of the fixed position coordinate system. Therefore, when the touch position calculation circuit 24 determines the peak X wire X(i) and the peak Y wire Y(j) out of all the detection wires in the "normal detection mode" by the above-discussed operation, the touch position calculation circuit 24 calculates the X coordinate Px(i) of the peak X wire X(i) and the Y coordinate Py(j) of the peak Y wire Y(j) from the data of the position coordinate system stored therein. In the stage where the touch panel of the first preferred embodiment which has the touch screen 1 is used in combination with a display device of a liquid crystal display or the like, in a display screen of the display device, with the leftmost and uppermost corner thereof as a reference point, the center position of each detection wire of which the position coordinates are determined on the above fixed position coordinate system of the touch screen 1 corresponds to a pixel position indicating where the pixel is as counted from the reference point.

If $CVbx(i+1) \geq CVbx(i-1)$ $$Pxt = Px(i) + \Delta Px \qquad \text{Eq. (5)}$$

If $CVbx(i+1) < CVbx(i-1)$ $$Pxt = Px(i) - \Delta Px \qquad \text{Eq. (6)}$$

Similarly, as an operation for calculating a touch Y coordinate Pyt, the touch position calculation circuit 24 determines if the relation between the detection values of the wires adjacent to the peak wire is CVby(j+1)≧CVby(j−1) (Step SD5) and thereby determines whether the touch position is present on the upper side or the lower side of the peak Y wire Y(j).

Specifically, if CVby(j+1)≧CVby(j−1), the touch position calculation circuit 24 determines that the touch Y coordinate Pyt is present on the lower side of the Y coordinate Py(j) of the peak Y wire Y(j) and calculates the amount of interpolation ΔPy by using Eq. (7) (Step SD6).

$$\Delta Py = f(CVby(j), CVby(j+1)) \quad \text{Eq. (7)}$$

Herein used is the same interpolation formula as used for calculation of the amount of interpolation ΔPx of the touch X coordinate Pxt.

On the other hand, if CVby(j+1)<CVby(j−1), the touch position calculation circuit 24 determines that the touch position (touch Y coordinate Pyt) is present on the upper side of the Y coordinate Py(j) of the peak Y wire Y(j) and calculates the amount of interpolation ΔPy by using Eq. (8) (Step SD7).

$$\Delta Py = f(CVby(j), CVby(j-1)) \quad \text{Eq. (8)}$$

Then, the touch position calculation circuit 24 calculates the touch Y coordinate Pyt from the Y coordinate Py(j) of the peak Y wire Y(j) and the amount of interpolation ΔPy by using Eqs. (9) and (10) (Step SD8).

If $CVby(j+1) \geq CVby(i-1)$ $$Pyt = Py(j) + \Delta Py \quad \text{Eq. (9)}$$

If $CVby(j+1) < CVby(j-1)$ $$Pyt = Py(j) - \Delta Py \quad \text{Eq. (10)}$$

After that, the touch position calculation circuit 24 sends out the touch coordinates (Pxt, Pyt) obtained by the interpolation process to the outside (Step SD9). Further, the touch position calculation circuit 24 sends notification that the interpolation is finished to the detection control circuit 25, and consequently, the detection control circuit 25 changes the predetermined count value CV to the predetermined count value CV1 and returns the mode to the "normal detection mode" (Step SD10).

The coordinates and the amount of interpolation may be calculated, for example, with the number of pixels in the display device used in combination as a reference.

Herein, the used interpolation formula is determined depending on how the detection value of the peak wire and the detection values of the adjacent wires change with respect to the touch position. In order to simplify the process, linear interpolation expressed by Eq. (11) may be used.

$$f(a,b) = (b/a) \cdot (p/2) \quad \text{Eq. (11)}$$

(p: pitch between X wires groups (column wire groups) or Y wire groups (row wire groups)

How the detection value of the peak wire and the detection values of the adjacent wires change, however, is generally nonlinear. This also depends on the distance from the detection wire group to a touch surface (the thickness of the base substrate 12) and the touch shape.

Figure 12:
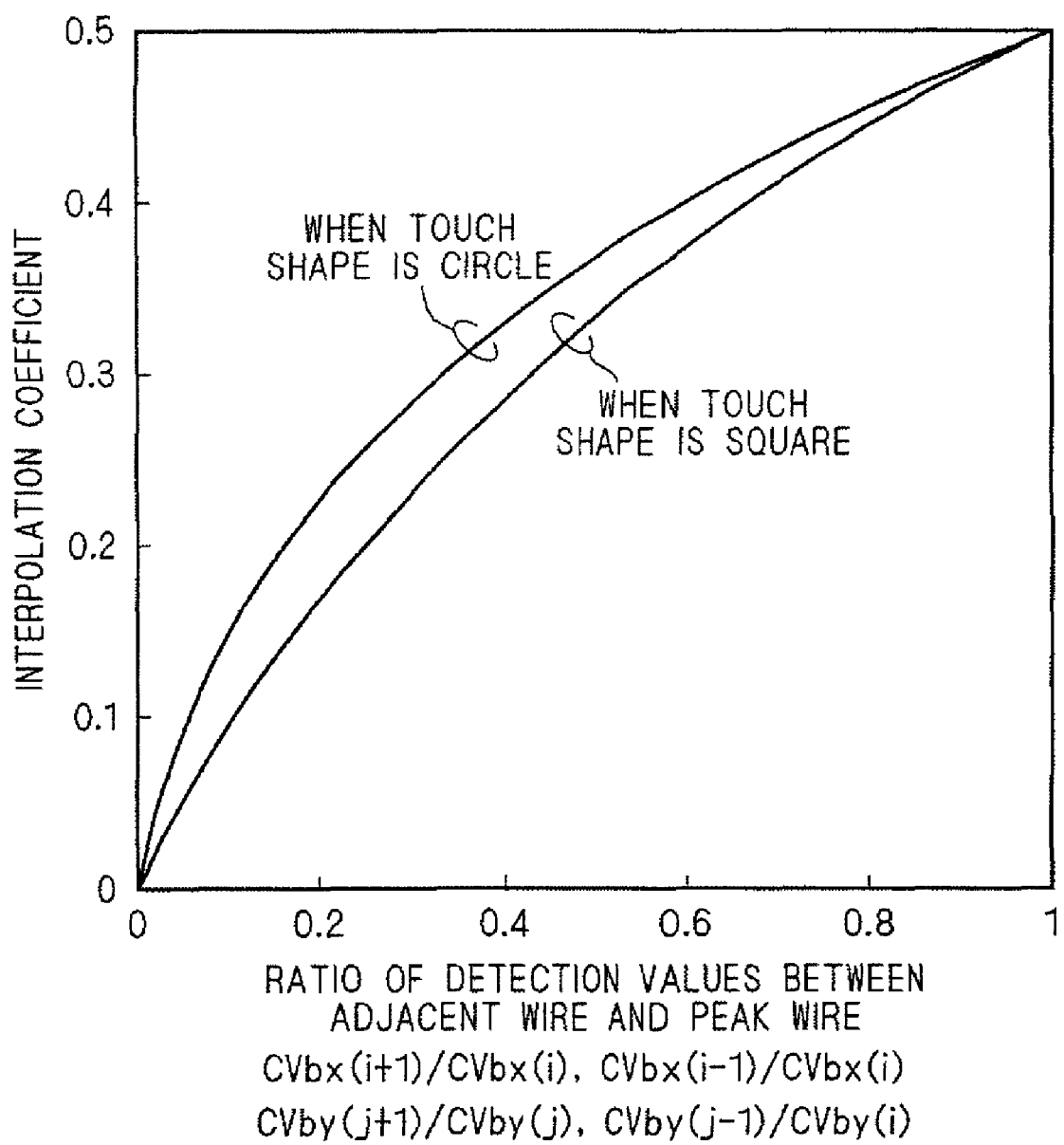
FIG. 12 is a view showing an example of interpolation properties in the touch panel in accordance with the first preferred embodiment of the present invention.

Then, for simple discussion, if it is assumed that the touch shape is, for example, a square or a circle and with a touch of the indicator, a capacitance by parallel plates composed of a touch portion and the wire group is formed, since the capacitance ratio between the adjacent wires is the ratio of areas in which the touch portion faces these wires, the characteristics of the interpolation coefficient are those shown in the simulation result of FIG. 12 and the amount of interpolation is obtained by multiplying the value of the interpolation coefficient shown in FIG. 12 by the wiring pitch p. If the touch shape is a square or a rectangle, the indicator shifts in only one of the horizontal direction and the vertical direction and the characteristic of the interpolation coefficient is close to linearity. On the other hand, if the touch shape is a circle, since the shift amount of the indicator is initially small, then gradually increases and thereafter decreases, the characteristic of the interpolation coefficient or the interpolation function f forms such a convex shape as shown in FIG. 12. The characteristic of the interpolation coefficient shown in FIG. 12 is calculated on the basis of a count value CVb which corresponds to the touch capacitance, which is calculated in the "high-accuracy detection mode" by subtracting the detection value Gb of the background capacitance. Therefore, in FIG. 12, when the ratio of the horizontal axis is zero, it is assumed that the capacitance value of any one of the adjacent wires (therefore, the count value CVb) is zero and the touch position of the indicator is present at the center position of the peak wire, and the value of the interpolation coefficient is set to zero.

Herein, the touch position calculation circuit 24 determines the interpolation formula by obtaining the interpolation coefficient one by one according to the characteristics of the interpolation coefficient, for example, shown in FIG. 12 and calculates the amount of interpolation according to the formula. There may be an alternative case where a look-up table set an interpolation curve is prepared and the touch position calculation circuit 24 calculates the amount of interpolation with reference to the look-up table. Though FIG. 12 shows the case where the touch shape is assumed to be a square or a circle and the interpolation coefficient is obtained by simulation, it is needless to say that the interpolation coefficient may be obtained by actual measurement (the amount of variation ACV2 is obtained by measuring the amount of increase and decrease in the count value CV2 of the second counter circuit 23b while actually shifting the finger that touches the touch panel step by step).

Herein, discussion will be made on an effect of shortening the detection time in the first preferred embodiment.

In the case where the touch coordinates are calculated by interpolation, the accuracy of the calculated touch coordinates depends on the detection accuracy for the touch capacitance detected by the detection wire. In the first preferred embodiment, the calculated coordinate accuracy depends on the detection accuracy in the high-accuracy detection mode wherein the detection value to be used for interpolation is obtained. On the other hand, in the case where detection is performed without switching the detection accuracy, in order to obtain equivalent detection accuracy, it is necessary to perform detection of all the detection wires with the detection accuracy of the high-accuracy detection mode of this preferred embodiment.

Figure 13:
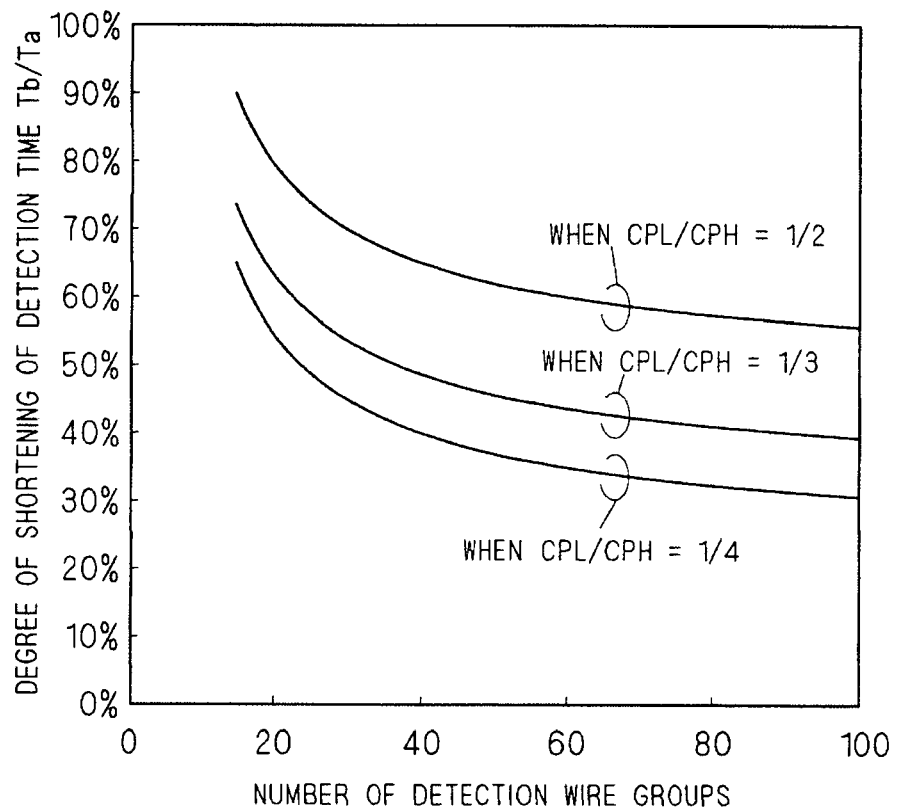
FIG. 13 is a view showing a relation between the number of detection wire groups and the degree of shortening of the detection time.

Then, defining the detection time of the case where detection of all the detection wires is performed with high accuracy without switching the detection accuracy as time Ta and defining the detection time of the case where the detection accuracy is switched as shown in this preferred embodiment as time Tb, a relation of the degree Tb/Ta of shortening the detection time with respect to the total number of detection wire groups (X wires and Y wires) is shown in FIG. 13. Defining the respective predetermined count values in the normal detection mode and the high-accuracy detection mode as CPL and CPH, FIG. 13 shows the above respective relations of the cases where the ratio of the count values CPL/CPH is ½, where the ratio CPL/CPH is 1/3, and where the ratio CPL/CPH is ¼.

As shown in FIG. 13, as the ratio of the detection accuracy in the normal detection mode to that in the high-accuracy detection mode, i.e., the ratio of the detection sensitivities becomes smaller or the number of detection wire groups becomes larger, the degree Tb/Ta of shortening the detection time becomes smaller. In other words, the effect of improving the detection time increases. Especially, in a case where the size of the touch screen is large and the number of detection wire groups has to be large, the detection time can be greatly shortened.

Though smoothing is performed by exponential averaging in the "background detection mode" in the first preferred embodiment, if it is determined from the interpolation accuracy or the like that smoothing is not needed, the exponential averaging is not needed (which corresponds to the case of $\alpha=0$).

Further, in the first preferred embodiment, even in a state where the detection wire groups are not connected, the oscillator circuit 21 is formed by connecting the elements such as the resistor and the like (C1 and R1 in FIG. 5). This is because there is a possibility that no detection wire group is connected to the inverting input end of the operational amplifier circuit 30 of the oscillator circuit 21 depending on the switching timing of the first and second switching circuits 20a, 20b, and 31 and it must be prevented that the oscillation cycle is largely shifted in the possible case and it takes much time to set the oscillation frequency at the returning to the state where the detection wire group is connected again. If the shift of the oscillation frequency is too small to be significant in a transient time while the detection wire group to be connected is switched by the analog multiplexer circuit 20a or 20b, there may be a case where neither of the capacitor C1 and the resistor R1 in the oscillator circuit 21 is not needed.

If there is a drift in the oscillation cycle of the oscillator circuit 21 itself immediately after the power-on, there may be a case where the degree of smoothing is lowered with $\alpha$ set to a relatively small value immediately after the power-on and with the passage of time, the degree of smoothing is increased with $\alpha$ gradually set to a large value.

Though the threshold value TL1 in the "normal detection mode" is used commonly for detection of the X wire and that of the Y wire in the exemplary case of the first preferred embodiment, in a case where the respective detection sensitivities (the degrees of variation in the detection value with respect to the touch capacitance) are different from each other or the like, different threshold values may be set for the X wire and the Y wire in the "normal detection mode".

Further, the exemplary case of the first preferred embodiment adopts the configuration wherein the first counter circuit 23a counts the oscillation output signal of the oscillator circuit 21 until the count value becomes the predetermined count value CP, the second counter circuit 23b counts the time period from the time when the counting is started to the time when the count value becomes the predetermined count value CP, and the second counter circuit 23b outputs the time period to the touch position calculation circuit 24 as the oscillation cycle detection result. Instead of this configuration, however, there may be another configuration wherein the time period while the first counter circuit 23a performs counting is set in advance to within a predetermined period (in other words, the time period for observing the output signal of the oscillator circuit 21 is set to a certain value) and a count value obtained through counting performed by the first counter circuit 23a within the predetermined period is used as the oscillation cycle detection result (in this case, the larger the oscillation cycle T is, the smaller the count value of the first counter circuit 23a becomes).

Though detection of the background capacitance is performed with the same accuracy as that used in the "high-accuracy detection mode", the detection of the background capacitance may be performed with another detection accuracy set to be higher than the detection accuracy in the "normal detection mode".

Though the interpolation is performed by using the respective detection values of the peak wire and its adjacent wires, if some touch capacitance is formed between not only the adjacent wire but also detection wires (e.g., next wires) continuous with the peak wire and the indicator with a touch of the indicator, the interpolation may be performed by also using this detection result together.

Advantages of the touch panel of the first preferred embodiment are as follows.

Specifically, in the touch panel of the first preferred embodiment, when a touch of the indicator is detected in the operation of the "normal detection mode" wherein the detection accuracy (detection sensitivity) of the electrostatic capacitance is low (rough), the mode is shifted to the "high-accuracy detection mode" wherein the detection accuracy (detection sensitivity) is higher than that of the "normal detection mode". In such a manner, the detection time is preferentially assigned to the detection wire corresponding to the tough of the indicator and the detection wires adjacent thereto. Then, in the first preferred embodiment, by using the detection value detected again in the "high-accuracy detection mode", the touch coordinates are calculated through interpolation. As compared with the case where the detection accuracy (detection sensitivity) is made high all the time, it is possible to shorten the time required for detection while ensuring the detection accuracy (detection sensitivity). Such an effect is remarkable especially when a large number of detection wires are needed to achieve desired touch resolution in a case where a large screen display device is equipped with the touch panel.

Further, whether or not there is a detection wire of which the detection value is equal to or larger than the first threshold value TL1 is determined and among the detection wires satisfying the above condition, the detection wire of which the detection value is maximum is set as a wire corresponding to a touch of the indicator. Then, by using the detection value of this wire and the detection value of one of the adjacent detection wires, of which the detection value is larger, interpolation is performed among their wire coordinates, whereby the touch coordinates are calculated. Therefore, it is possible to determine if there is a touch and identify the detection wire corresponding to the touch by a simple method and to increase the accuracy of the calculated touch coordinates.

Since the first counter circuit 23a counts the output from the oscillator circuit 21 and the second counter circuit 23b counts the time period until the count value becomes the predetermined count value CP, the oscillation cycle is accumulated and averaged and consequently, it is possible to detect a stable oscillation cycle even with occurrence of extraneous noise and the like and to achieve an electrostatic capacitance detection result.

Further, by changing the predetermined count value CP up to which the first counter circuit 23a counts, it is possible to easily switch the detection accuracy for the touch coordinates.

Since the interpolation is performed with the reference detection value (background detection value) of the electrostatic capacitance which is detected in the "background detection mode" as a reference, it is possible to increase the accuracy for calculation of the touch coordinates through interpolation.

Since the "background detection mode" is performed every time when the "normal detection mode" is repeated a predetermined number of times, it is possible to decrease the frequency of occurrence of the dead time in detection of when a touch of the indicator occurs.

The Second Preferred Embodiment

The second preferred embodiment relates to a liquid crystal display in which a touch panel and a liquid crystal display panel are united by attaching the touch screen 1 of the first preferred embodiment to the liquid crystal display panel.

Figure 14:
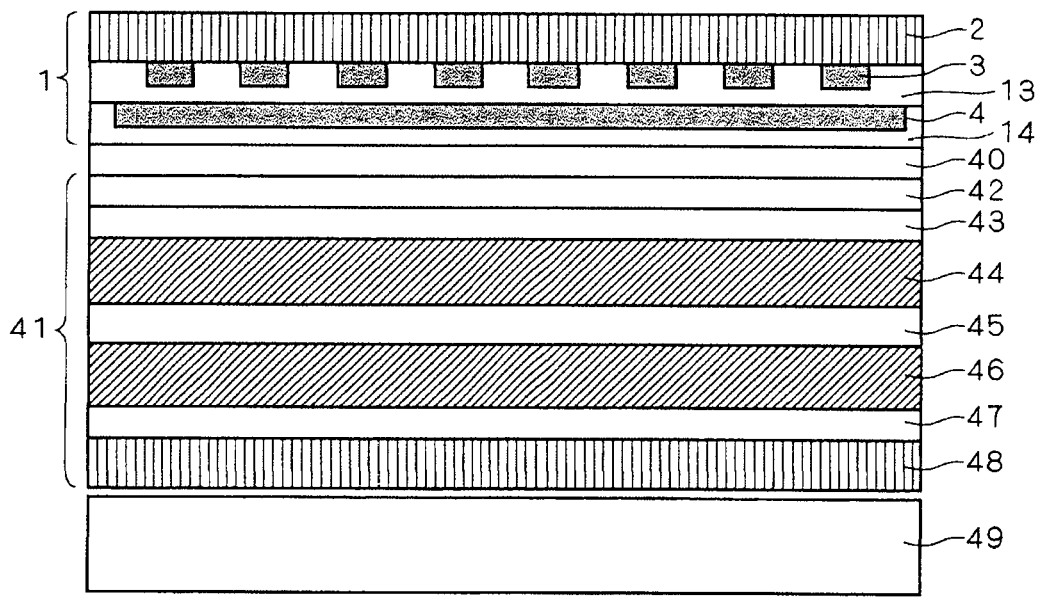
FIG. 14 is a longitudinal section showing a structure of a liquid crystal display in accordance with a second preferred embodiment of the present invention.

FIG. 14 is a view showing a longitudinal section structure of a liquid crystal display in accordance with the second preferred embodiment. A liquid crystal display panel 41 comprises a color filter substrate 44 in which a color filter, a black matrix, a transparent electrode, an orientation film are formed on a glass substrate, a TFT array substrate 46 in which a TFT (thin film transistor) or the like serving as a switching element is formed on the glass substrate, a liquid crystal layer 45 formed of a TN liquid crystal held by the substrates 44 and 46, and a polarizing plate 48 adhered to the back surface side of the TFT array substrate 46 with an adhesive layer 47. Further, a polarizing plate 42 is adhered to the front surface of the color filter substrate 44 with an adhesive layer 43. On the back surface side of the liquid crystal display panel 41, provided is a backlight 49 serving as a light source.

On the other hand, the touch screen 1 of the first preferred embodiment is adhered to the polarizing plate 42 on the front surface side of the liquid crystal display panel 41 with an adhesive layer 40.

A signal in accordance with an image to be displayed is inputted to the TFT array substrate 46 from an external driver circuit (not shown in FIG. 14) and according to the signal, the applied voltage of the liquid crystal layer 45 is controlled through the switching element of the TFT which is formed for each pixel, whereby the arrangement direction of liquid crystal molecules in the liquid crystal layer 45 is changed. Incident light from the backlight 49 passes through the polarizing plate 48 to become linearly polarized light, passes through the liquid crystal layer 45 to bend its oscillation direction according to an image signal for display, passes through the color filter formed on the color filter substrate 44 to be divided into lights of three primary colors, and further passes through the polarizing plate 42 on the front surface side to become light having the light intensity according to the image signal. Then, the light passing through the polarizing plate 42 goes through the touch screen 1 provided on the front surface thereof to be viewed by a user as the display light.

Thus, by controlling the transmittance of the light from the backlight 49 according to the image signal, the liquid crystal display can perform a desired display. The touch panel including the touch screen 1 calculates the touch coordinates on the basis of the variation in the oscillation cycle and outputs the calculated touch coordinates, like in the first preferred embodiment.

At that time, in the touch screen 1 of the first preferred embodiment, since decrease in the transmittance of the display light is suppressed by forming a detection wire group of a plurality of detection wires and setting the area of a slit-like opening between the detection wires to be large, almost all the light passing through the polarizing plate 42 goes through the touch screen 1 and become the display light. Therefore, even if the touch screen 1 is provided on the front surface of the liquid crystal display panel 41, the display luminance is hardly decreased.

A liquid crystal other than the TN liquid crystal, such as an SYN liquid crystal, may be used to form the liquid crystal display like in the second preferred embodiment.

Further, though discussion has been made on the liquid crystal display as the display device in the second preferred embodiment, even other types of display devices such as an organic or inorganic EL display and a PDP device may be also adopted as the display device including the touch panel of the first preferred embodiment.

In the second preferred embodiment, since the display device is constituted of the touch screen 1 and the liquid crystal display panel 41 which are adhered to each other and united, this eliminates the necessity of a holding mechanism for the touch screen which has been conventionally needed and it is therefore possible to decrease the thickness of the device on the whole.

Further, since the display device is constituted of the touch screen 1 and the liquid crystal display panel 41 which are united, it is possible to prevent any ill effect on display, which is caused by contamination with extraneous matters such as dirt in a gap between the touch screen 1 and the liquid crystal display panel 41.

(Notes)

While the invention has been shown and described in detail, the foregoing description is in all aspects illustrative and not restrictive. It is therefore understood that numerous modifications and variations can be devised without departing from the scope of the invention.

Though, for example, the detection circuit 19 calculates both the X coordinate value and the Y coordinate value of the touch coordinates on the touch screen 1 which indicate the touch position of the indicator, instead of this, the detection circuit 19 may calculate one of the X coordinate value and the Y coordinate value of the touch coordinates on the basis of the calculation method discussed in the first preferred embodiment and calculate the other coordinate value on the basis of one of other methods.

Further, "detection wire" is a word or a concept including not only the case where one detection wire group is constituted of a plurality of detection wires (the case shown in FIG. 1) but also the case where one detection wire group is formed by so-called solid wiring, i.e., as one wire.

INDUSTRIAL APPLICABILITY

The touch screen of the present invention is favorably used in a liquid crystal display in combination with, for example, a TFT liquid crystal display panel.

The invention claimed is:

1. A touch panel comprising:
   a touch screen including a plurality of detection wires formed in each of a row direction and a column direction;
   a switching circuit for selecting some of said plurality of detection wires;
   an electrostatic capacitance detection circuit for outputting, according to a set detection accuracy, a detection value corresponding to electrostatic capacitance formed between said detection wire selected by said switching circuit and an indicator that touches said touch screen;
   a touch position calculation circuit for calculating coordinates of a position on said touch screen which said indicator touches on the basis of said detection value of said electrostatic capacitance detection circuit;

and a detection control circuit for controlling said switching circuit, said electrostatic capacitance detection circuit, and said touch position calculation circuit, wherein in a normal detection mode, said detection control circuit sets a first detection accuracy in said electrostatic capacitance detection circuit and controls said switching circuit to sequentially select said plurality of detection wires, and said touch position calculation circuit specifies a touch detection wire on the basis of said detection value of said electrostatic capacitance detection circuit in which said first detection accuracy is set, said touch detection wire being said detection wire with a maximum detection value corresponding to electrostatic capacitance formed between said detection wire and said indicator that touches said touch screen, with said maximum detection value being equal to or higher than a first threshold value, and in a high-accuracy detection mode to which the mode is shifted from said normal detection mode when said touch detection wire is specified by said touch position calculation circuit, said detection control circuit sets a second detection accuracy higher than said first detection accuracy in said electrostatic capacitance detection circuit and controls said switching circuit to sequentially select said touch detection wire and said detection wires adjacent thereto, and said touch position calculation circuit calculates coordinates of a position which said indicator touches on the basis of a value obtained by subtracting a background detection value based on said detection value of when there is no touch of said indicator from said detection value of said electrostatic capacitance detection circuit in which said second detection accuracy is set, and in a background detection mode to which the mode is shifted from said normal detection mode when said touch detection wire is not specified by said touch position calculation circuit, said detection control circuit sets a third detection accuracy higher than said first detection accuracy in said electrostatic capacitance detection circuit and controls said switching circuit to sequentially select said plurality of detection wires, and said touch position calculation circuit calculates said background detection value on the basis of the detection values when all said detection values on said plurality of detection wires which are outputted from said electrostatic capacitance detection circuit in which said third detection accuracy is set are lower than a second threshold value, and the mode is shifted to said normal detection mode from each of said high-accuracy detection mode and said background detection mode after the operation thereof is finished.

2. The touch panel according to claim 1, wherein the operation of said background detection mode is performed when said touch detection wire is not specified by said touch position calculation circuit every time when the operation of said normal detection mode is repeated a predetermined number of times.

3. The touch panel according to claim 1, wherein said electrostatic capacitance detection circuit comprises:

an oscillator circuit for oscillating an oscillation output signal of which the oscillation cycle changes according to said electrostatic capacitance formed between said detection wire selected by said switching circuit and said indicator;

a first counter circuit for counting said oscillation output signal from said oscillator circuit up to a predetermined count value which is set as said detection accuracy; and a second counter circuit for counting a predetermined clock signal to thereby count a time period needed from the time when said first counter circuit starts a counting operation to the time when the count value of said first counter circuit becomes said predetermined count value.

4. The touch panel according to claim 1, wherein said electrostatic capacitance detection circuit comprises:

an oscillator circuit for oscillating an oscillation output signal of which the oscillation cycle changes according to said electrostatic capacitance formed between said detection wire selected by said switching circuit and said indicator; and a counter circuit for counting said oscillation output signal from said oscillator circuit over a predetermined time period which is set as said detection accuracy.

5. The touch panel according to claim 1, wherein said touch position calculation circuit performs interpolation of coordinates between coordinates of said touch detection wire and coordinates of one of said detection wires adjacent to said touch detection wire on the basis of said detection value corresponding to said touch detection wire specified in said normal detection mode and the larger one of said detection values corresponding to said two detection wires adjacent to said touch detection wire, to thereby calculate coordinates of the position which said indicator touches.

6. A display device comprising:

a touch panel;

and a display panel, wherein said touch panel comprises:

a touch screen including a plurality of detection wires formed in each of a row direction and a column direction;

a switching circuit for selecting some of said plurality of detection wires;

an electrostatic capacitance detection circuit for outputting, according to a set detection accuracy, a detection value corresponding to electrostatic capacitance formed between said detection wire selected by said switching circuit and an indicator that touches said touch screen;

a touch position calculation circuit for calculating coordinates of a position on said touch screen which said indicator touches on the basis of said detection value of said electrostatic capacitance detection circuit;

and a detection control circuit for controlling said switching circuit, said electrostatic capacitance detection circuit, and said touch position calculation circuit, and in a normal detection mode, said detection control circuit sets a first detection accuracy in said electrostatic capacitance detection circuit and controls said switching circuit to sequentially select said plurality of detection wires, and said touch position calculation circuit specifies a touch detection wire on the basis of said detection value of said electrostatic capacitance detection circuit in which said first detection accuracy is set, said touch detection wire being said detection wire with a maximum detection value corresponding to electrostatic capacitance formed between said detection wire and said indicator that touches said touch screen, with said maximum detection value being equal to or higher than a first threshold value, and in a high-accuracy detection mode to which the mode is shifted from said normal detection mode when said touch detection wire is specified by said touch position calculation circuit, said detection control circuit sets a second detection accuracy higher than said first detection accuracy in said electrostatic capacitance detection circuit and controls said switching circuit to sequentially select said touch detection wire and said detection wires adjacent thereto, and said touch position calculation circuit calculates coordinates of a position which said indicator touches on the basis of a value obtained by subtracting a background detection value based on said detection value of when there is no touch of said indicator from said detection value of said electrostatic capacitance detection circuit in which said second detection accuracy is set, and in a background detection mode to which the mode is shifted from said normal detection mode when said touch detection wire is not specified by said touch position calculation circuit, said detection control circuit sets a third detection accuracy higher than said first detection accuracy in said electrostatic capacitance detection circuit and controls said switching circuit to sequentially select said plurality of detection wires, and said touch position calculation circuit calculates said background detection value on the basis of the detection values when all said detection values on said plurality of detection wires which are outputted from said electrostatic capacitance detection circuit in which said third detection accuracy is set are lower than a second threshold value, and the mode is shifted to said normal detection mode from said high-accuracy detection mode or said background detection mode after the operation thereof is finished.

7. The display device according to claim 6, wherein said touch screen included in said touch panel is adhered to the front surface side of said display panel.

* * * * *